United States Patent [19]

Garrett

[11] Patent Number: 4,499,924

[45] Date of Patent: Feb. 19, 1985

[54] METHOD OF MAKING A DRILL PIPE WEAR SLEEVE ASSEMBLY AND PRODUCT THEREOF

[75] Inventor: William R. Garrett, Houston, Tex.

[73] Assignee: Smith International, Inc., Newport Beach, Calif.

[21] Appl. No.: 357,783

[22] Filed: Mar. 12, 1982

Related U.S. Application Data

[63] Continuation-in-part of Ser. No. 197,057, Oct. 14, 1980, abandoned, which is a continuation of Ser. No. 010,235, Feb. 8, 1979, abandoned, which is a continuation-in-part of Ser. No. 818,672, Jul. 25, 1977, Pat. No. 4,146,060.

[51] Int. Cl.$^3$ .......................... E21B 17/10; B26F 3/00; B23K 28/00; B23P 17/00
[52] U.S. Cl. .................................. 138/110; 138/143; 228/170; 228/176
[58] Field of Search ............... 308/4 A; 228/170, 216, 228/176; 225/2, 93.5; 138/143, 110

[56] References Cited

U.S. PATENT DOCUMENTS

| 1,630,759 | 5/1927 | Pierce ..................... 225/2 |
| 3,499,210 | 3/1970 | Schellstede ............... 308/4 A X |
| 3,667,817 | 6/1972 | Kellner .................... 308/4 A |
| 3,958,732 | 5/1976 | Aoyama et al. ........... 225/93.5 |
| 3,994,054 | 11/1976 | Cuddon-Fletcher ........ 225/2 X |
| 4,146,060 | 3/1979 | Garret ..................... 308/4 A X |

FOREIGN PATENT DOCUMENTS

| 507415 | 4/1976 | U.S.S.R. ............... 225/93.5 |
| 197710 | 10/1977 | U.S.S.R. ............... 225/93.5 |

OTHER PUBLICATIONS

Hayden et al., *Structure and Properties of Materials*, vol. III, Jon Wiley & Sons, 1965, pp. 102–103, 131, 143, 161, 165.

Primary Examiner—Kenneth J. Ramsey

[57] ABSTRACT

A drill pipe comprises a tube, a tool joint at each end of the tube, each tool joint having a larger outer diameter than the tube, a fractured sleeve having an internal diameter smaller than the external diameter of the tool joints but slightly larger than the outer diameter of the tube welded together about the tube, and adhesive cement between the sleeve and tube affixing the sleeve to the tube. The sleeve is fractured by forming a plurality of external longitudinal grooves therein not in excess of 180 degrees apart circumferentially, cooling the sleeve to at least the ductile-brittle transition temperature, placing the sleeve on a split tubular internally tapered mandrel, and forcing a wedge into the mandrel with a hammer blow to fracture the sleeve along said grooves into a plurality of segments. The segments are positioned with the fractured surfaces aligned to reform the sleeve about the tube in the desired axial position therealong and the segments are then welded together by filling in the grooves with weld metal.

15 Claims, 39 Drawing Figures

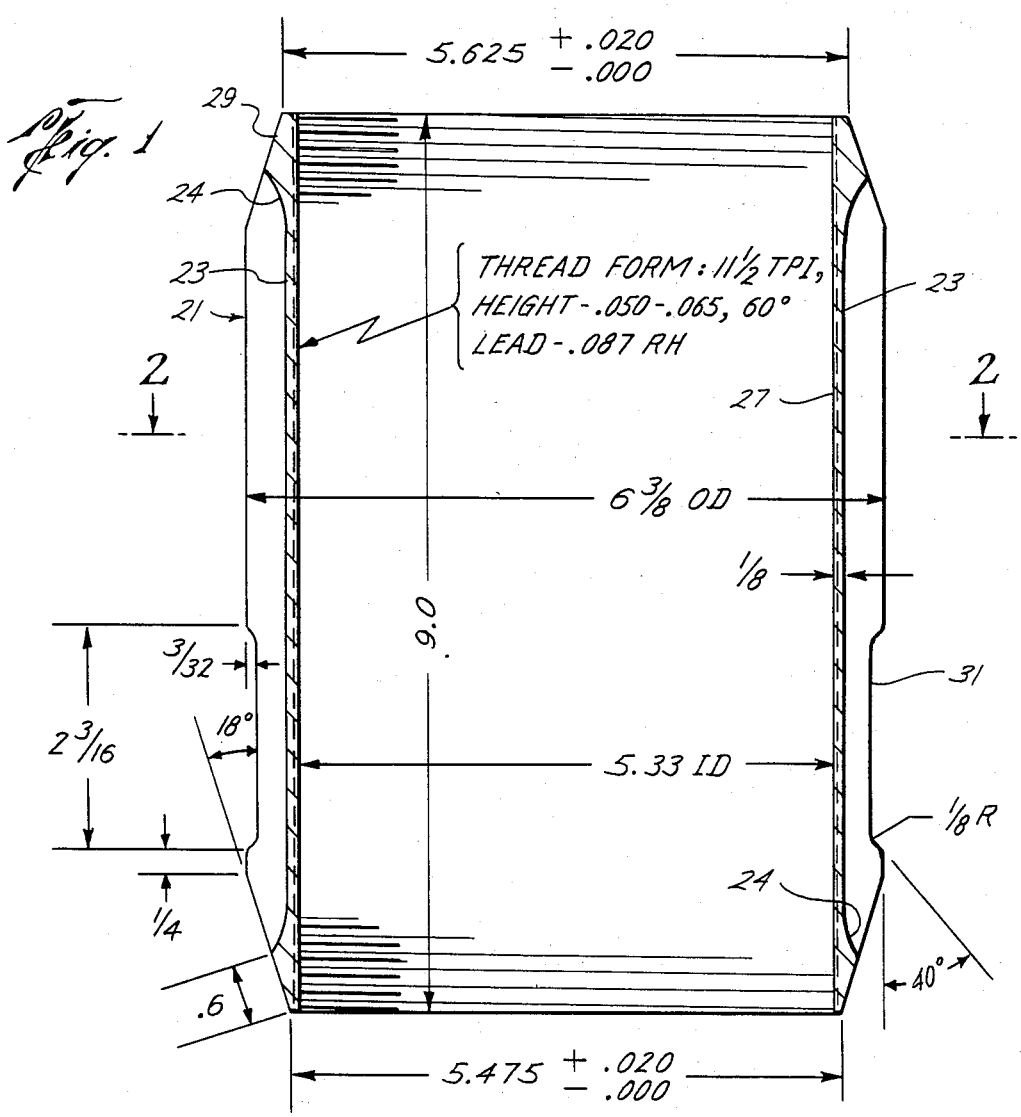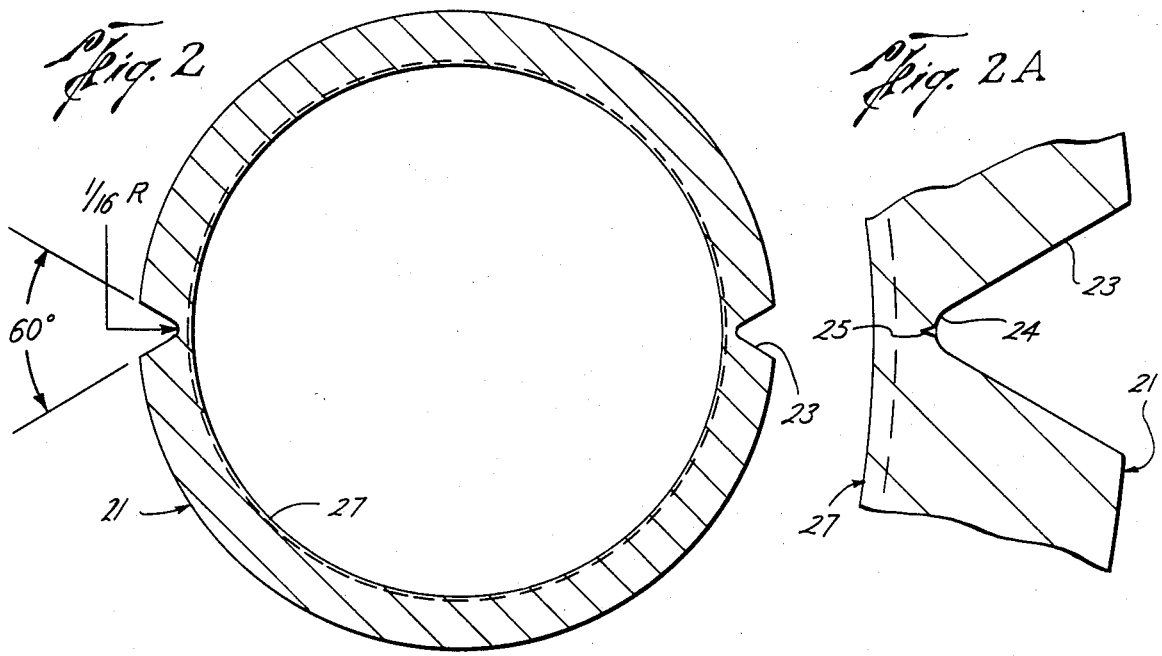

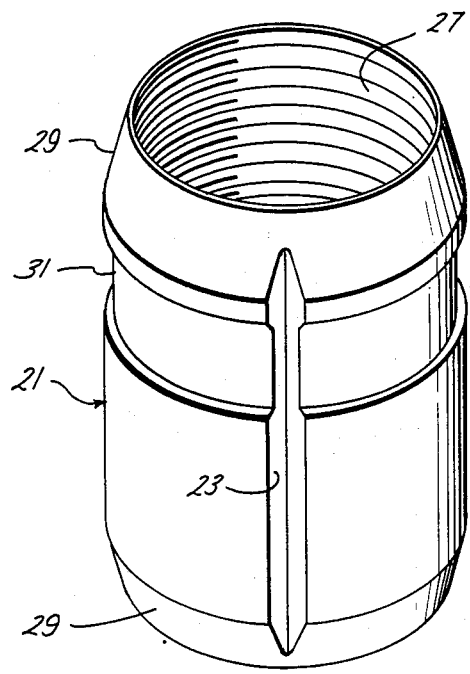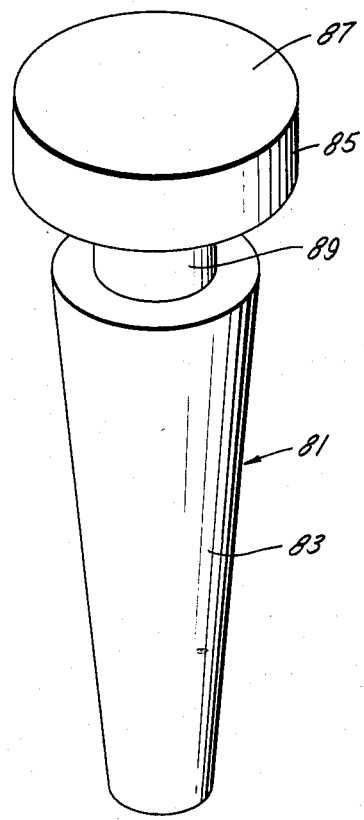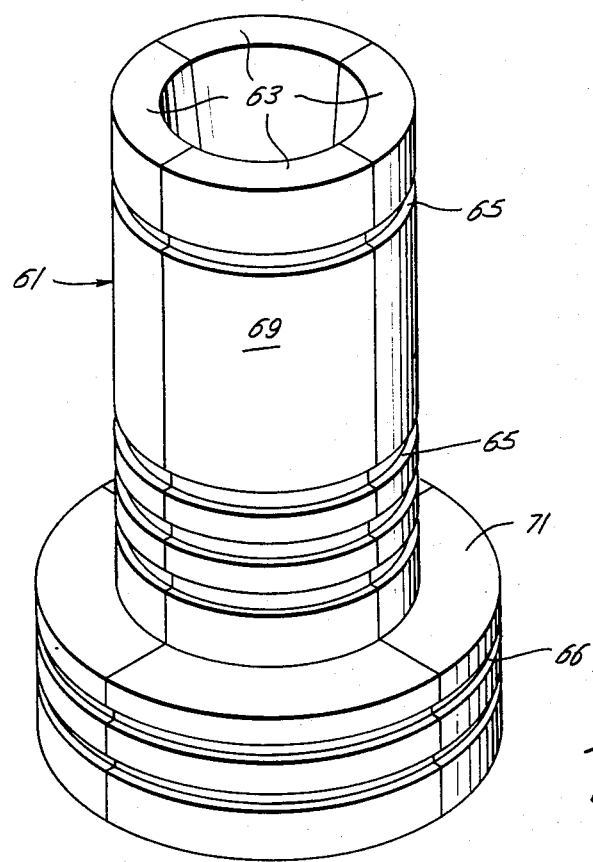

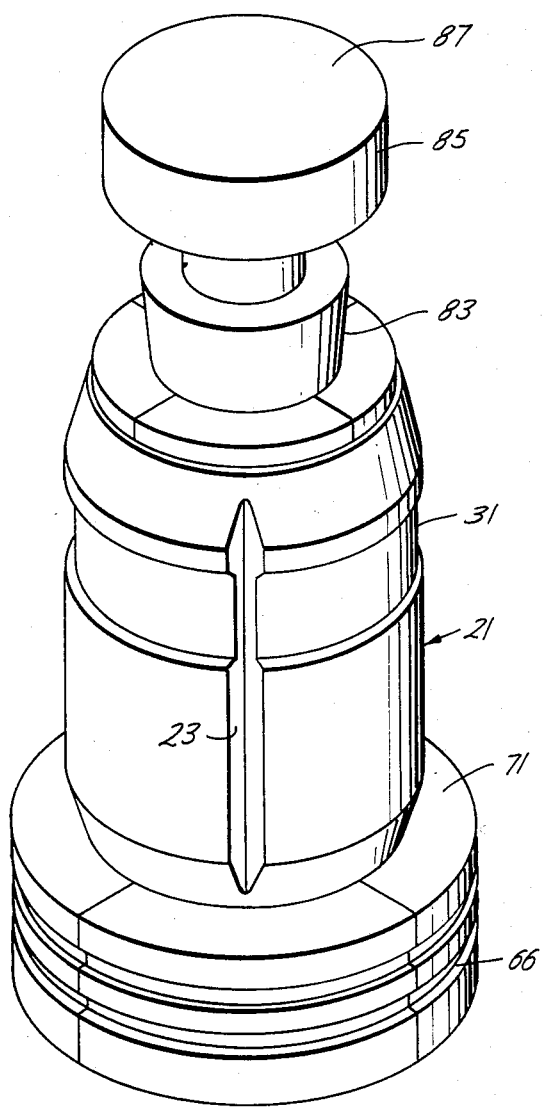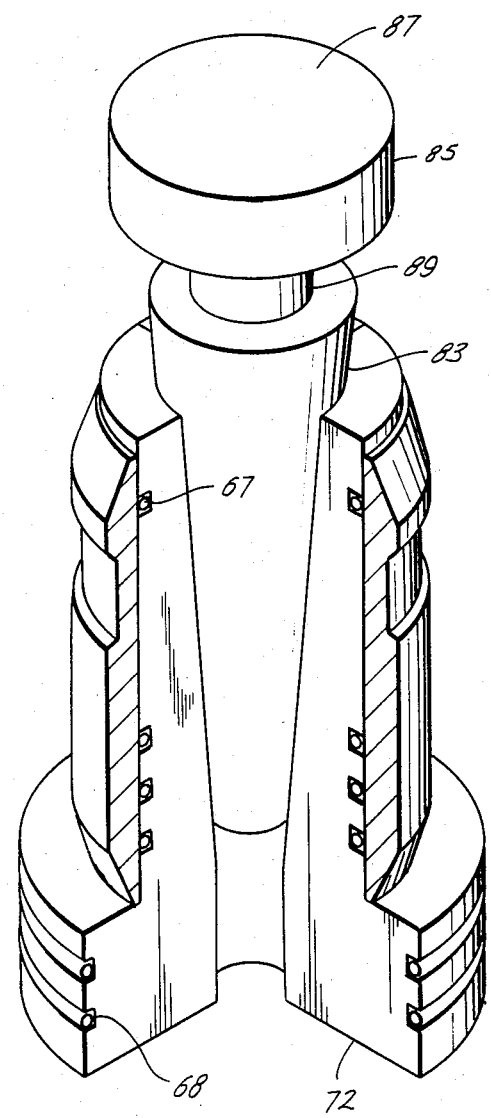

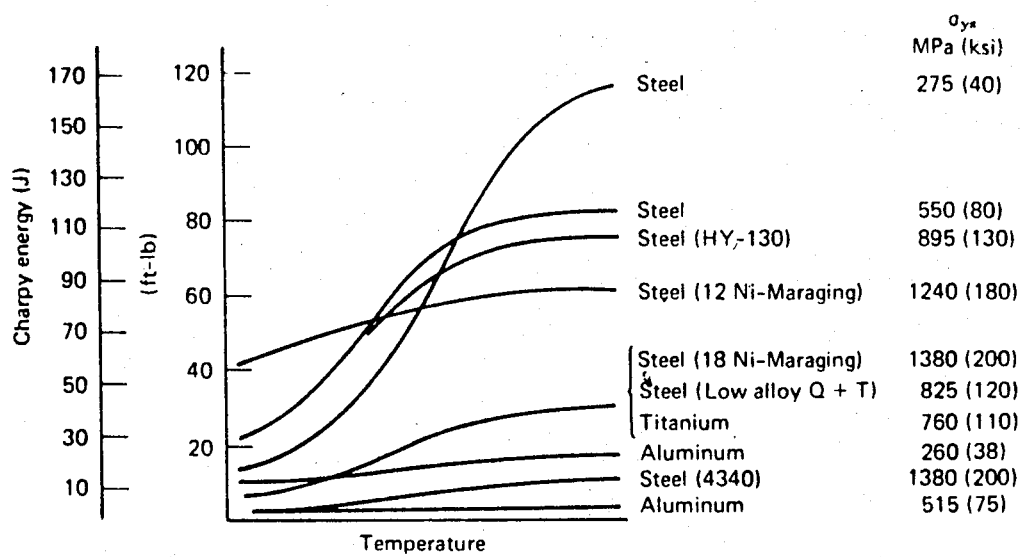
FIGURE 8A  Charpy impact energy versus temperature behavior for several engineering alloys.
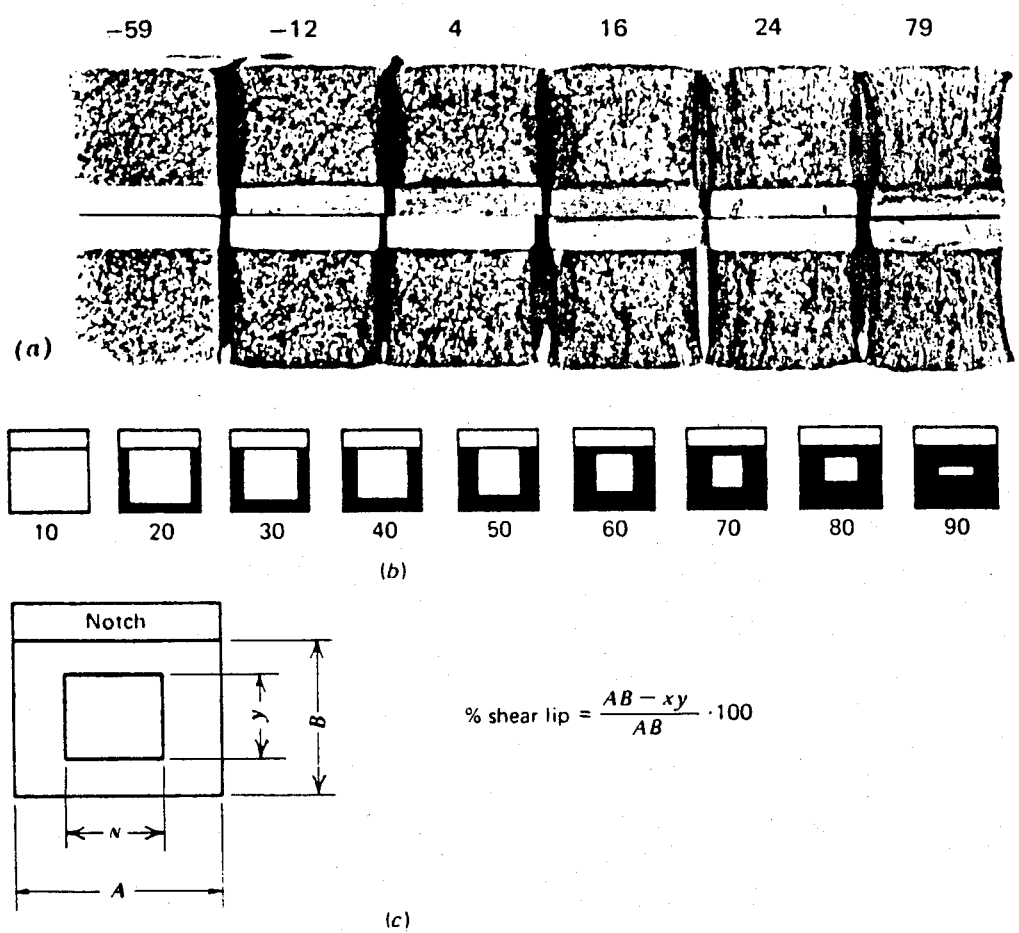
FIGURE 8B  Transition in fracture surface appearance as function of test temperature. (a) Actual fracture series for A36 steel tested in the transverse direction; (b) standard comparison chart showing percent shear lip; (c) computation for percent shear lip.

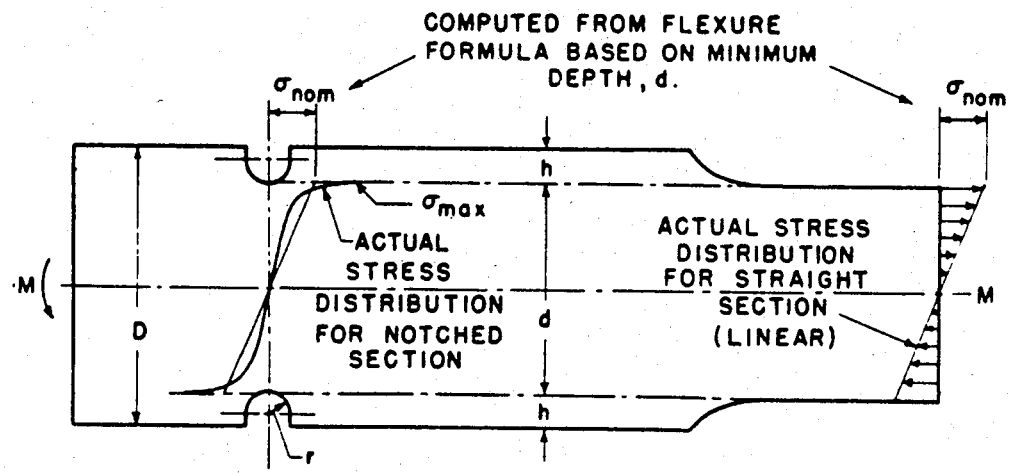
FIG. 8C
STRESS CONCENTRATION INTRODUCED BY NOTCH.
(OR IN GENERAL BY CROSS SECTIONAL CHANGE WHICH IS NOT GRADUAL)
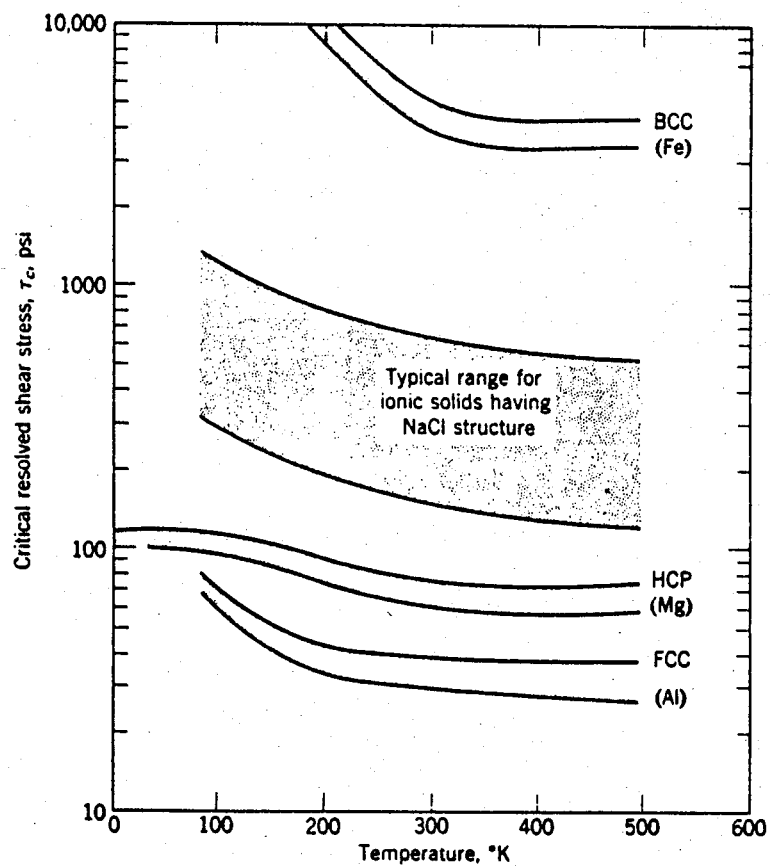
Figure 8D Temperature variation of critical resolved shear stress for several classes of crystalline materials.

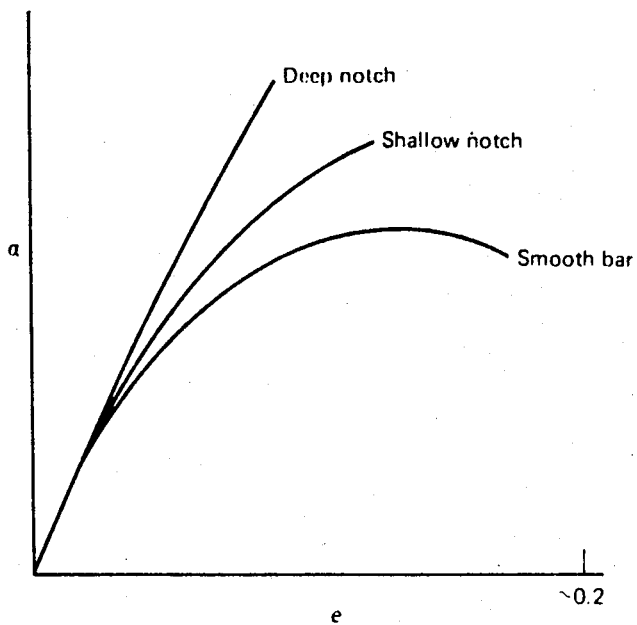
FIGURE 8E Plastic constraint resulting from triaxial stresses at notch root produces elevation of flow curve in ductile material.
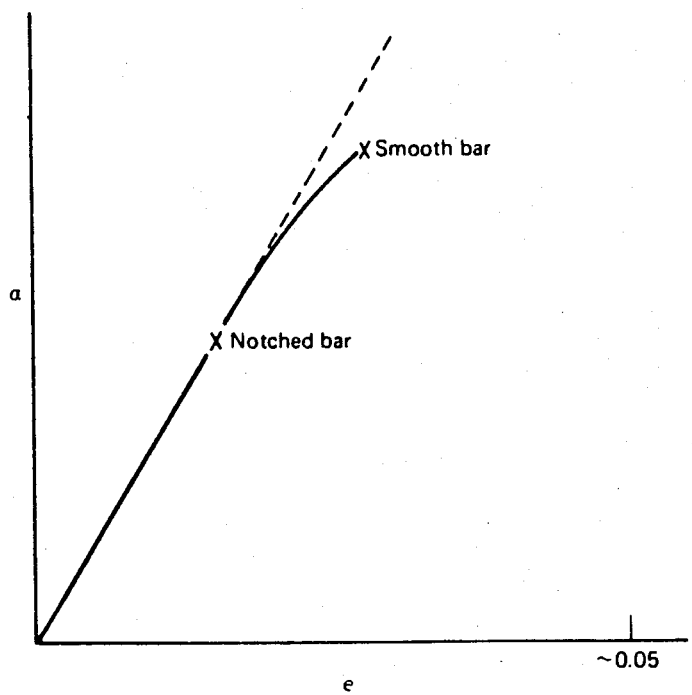
FIGURE 8F With little intrinsic plastic flow capacity, introduction of sharp crack induces premature brittle failure.

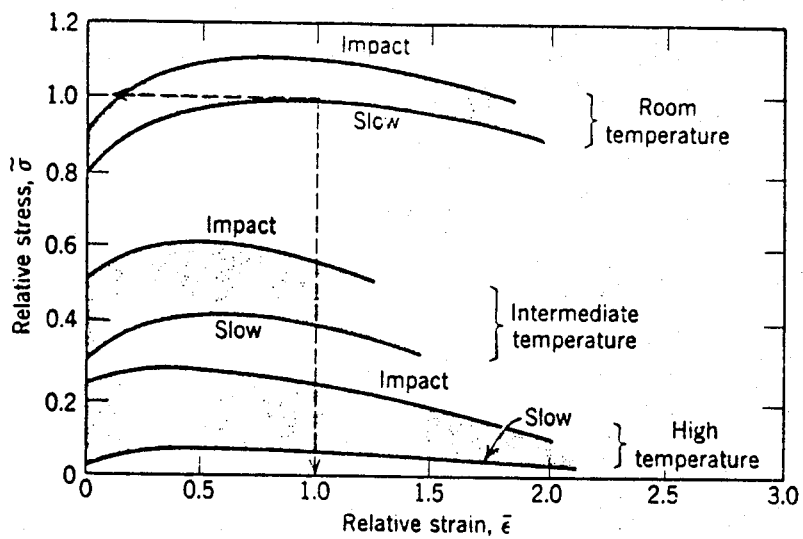
Figure 8G Typical stress-strain curves for slow strain rates and impact rates as they change with temperature. Relative stress and relative strain of 1.0 correspond to the stress and strain at which the UTS occurs at room temperature for slow straining.
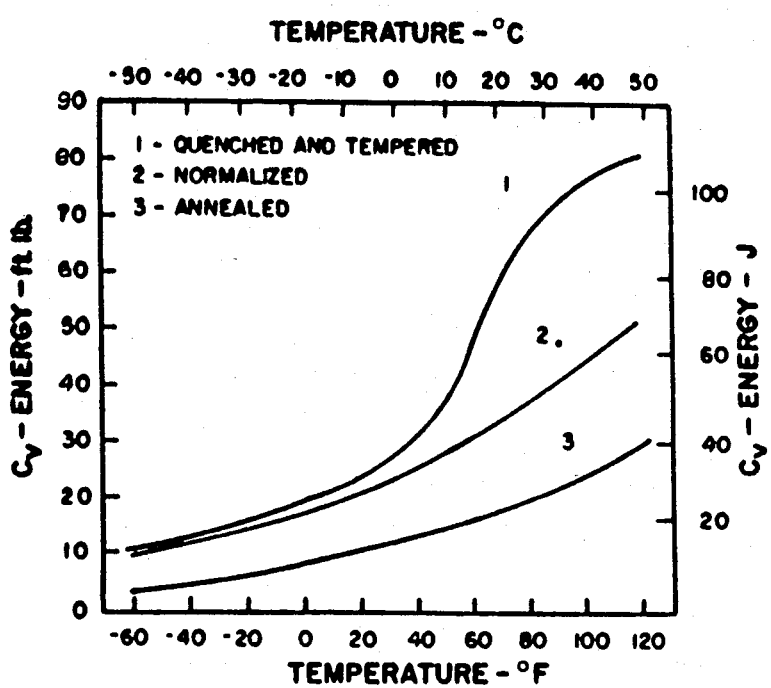
Fig. 8H Effect of various heat treatments on the Charpy V-notch transition curves of a 0.30% carbon steel (1).

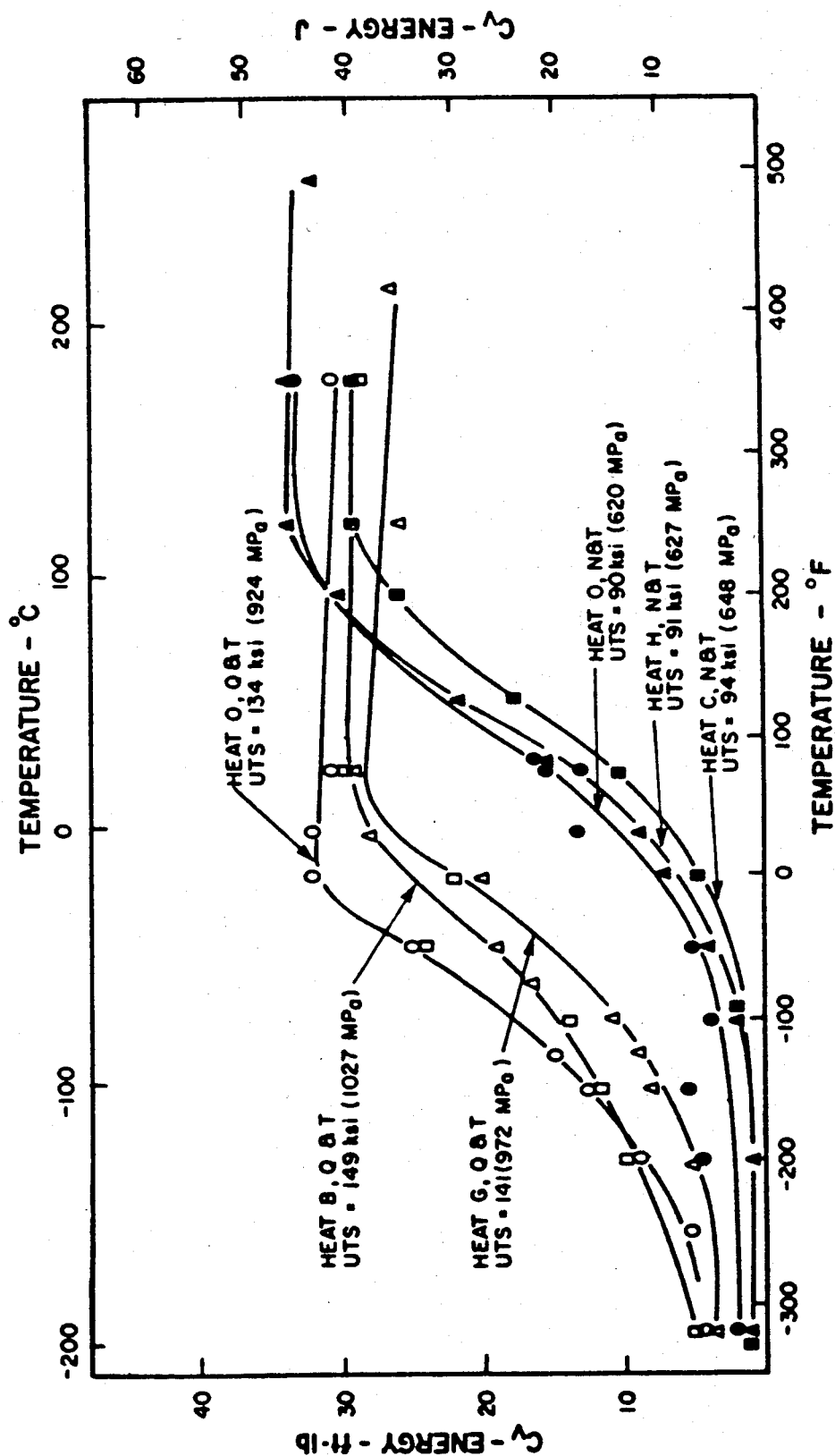
Fig 8I Charpy V-notch test results for various heats of cast 8630 steel in the quenched and tempered and normalized and tempered conditions (4).

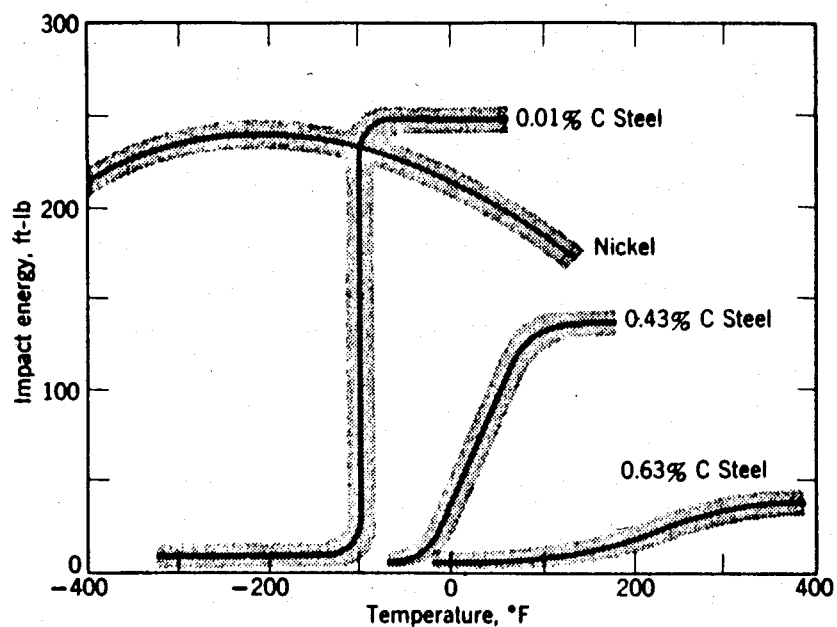
Figure 8J Impact test results for several alloys over a range of testing temperatures.
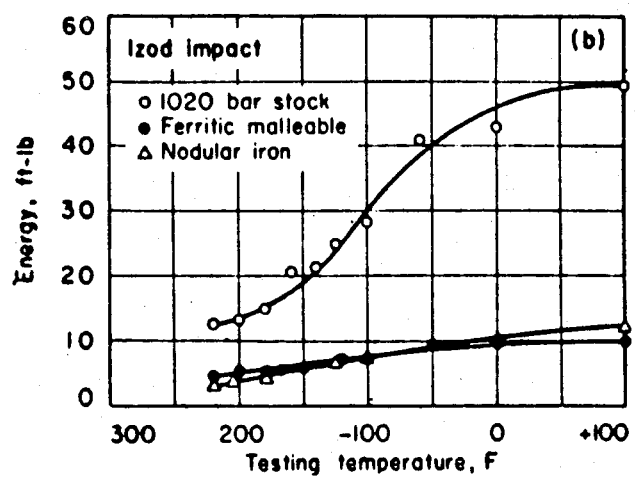
Fig. 8K Impact test results on nodular iron at different temperatures

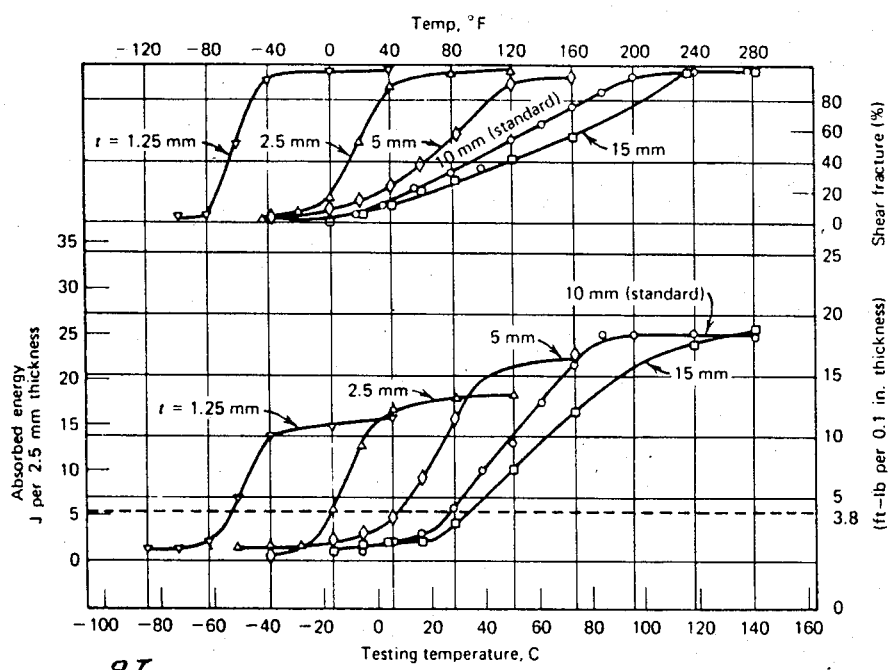

FIGURE 8L Adjusted energy-temperature curves and shear fracture-temperature curves for 38 mm thick plate of A283 steel tested with Charpy V-notch specimens of various thickness. Absorbed energy defined at 5.2 J/2.5 mm (3.8 ft-lb/0.1 in.) of specimen thickness.[3]

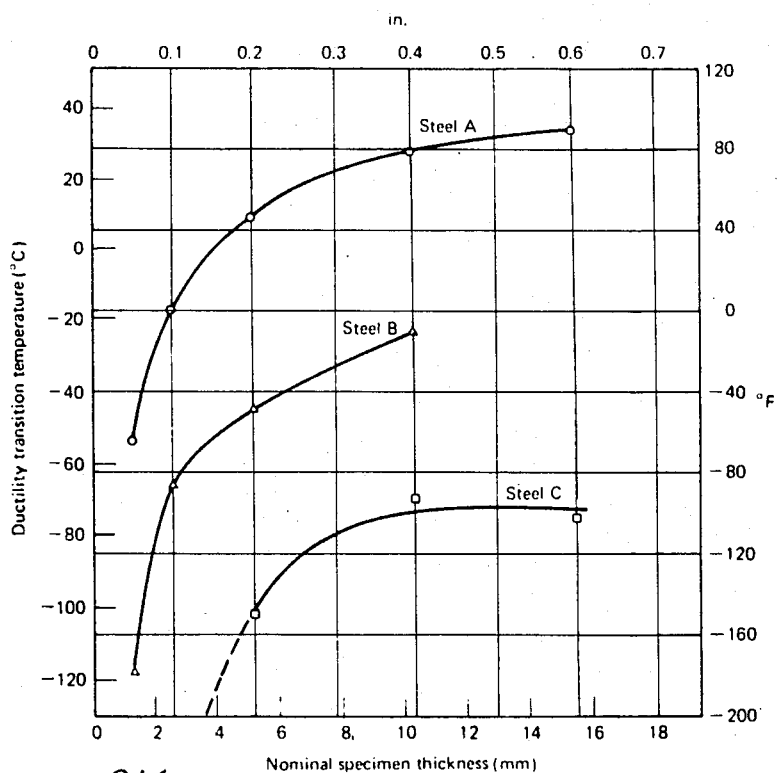

FIGURE 8M Effect of specimen thickness on Charpy V-notch ductility transition temperature of steels A, B, and C. The ductility transition temperature was selected with the same relative energy/unit thickness ratio given in Fig. 9.11.[3]

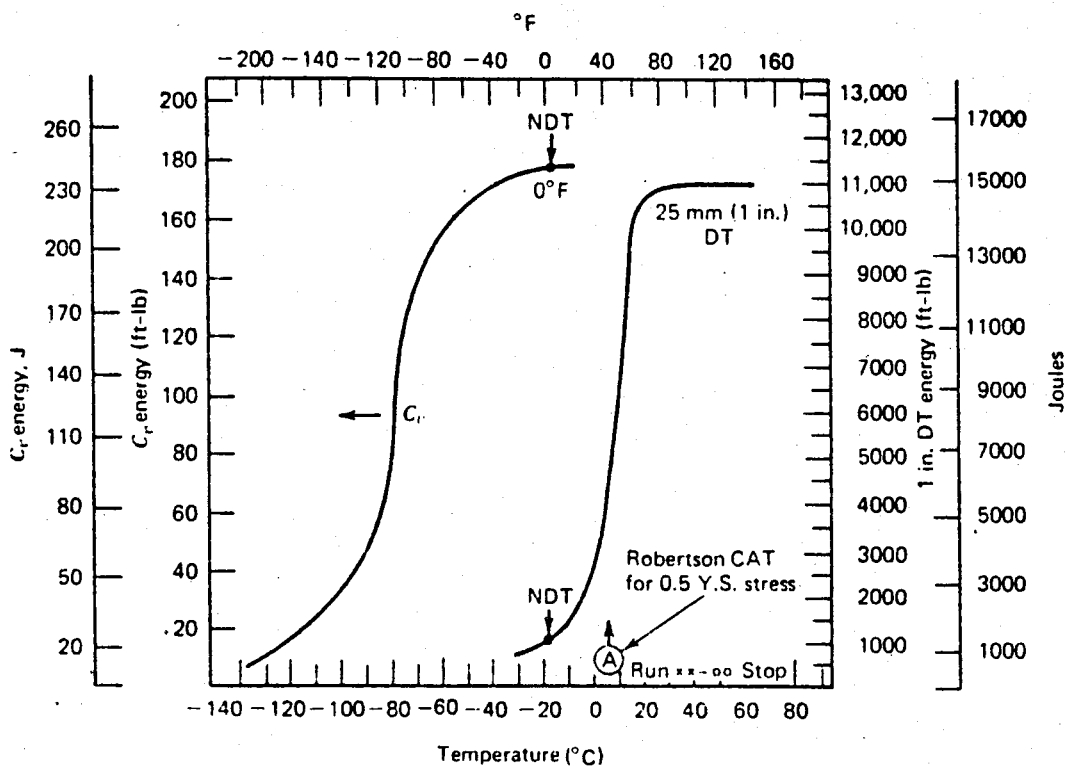

FIGURE 8N  Comparison of Charpy V-notch, dynamic tear, drop-weight NDT, and Robertson crack arrest test results for A541 (Class 6 steel at 580 MPa yield strength). Note that the $C_v$ test indicates a very high level of toughness at the NDT temperature that, in reality, corresponds to brittle behavior as indicated by the DT and Robertson test results.[10]

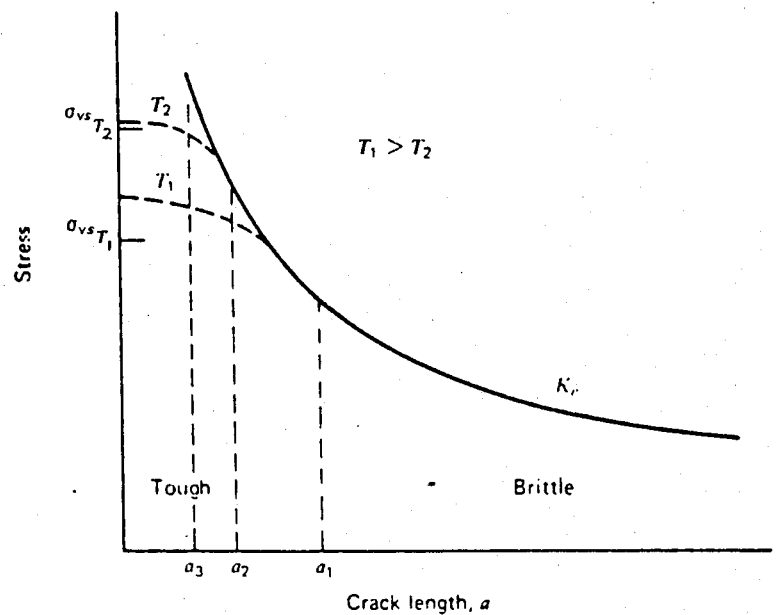

FIGURE 8O  Schematic diagram showing relationship between allowable stress level and flaw size. Solid line represents material fracture toughness $K_c$; dashed lines show effect of plasticity.

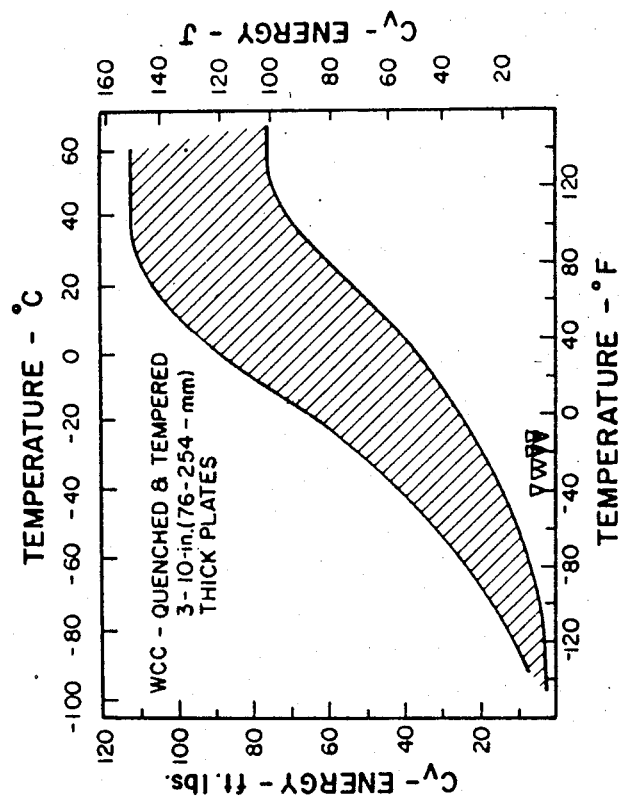
Fig. 8O NDTT values (triangles) and the scatter band of Charpy V-notch energy transition curves of several quenched and tempered C-Mn cast steels (A216, grade WCC). Nominal ultimate tensile strength = 80 ksi (552 MPa) (1).
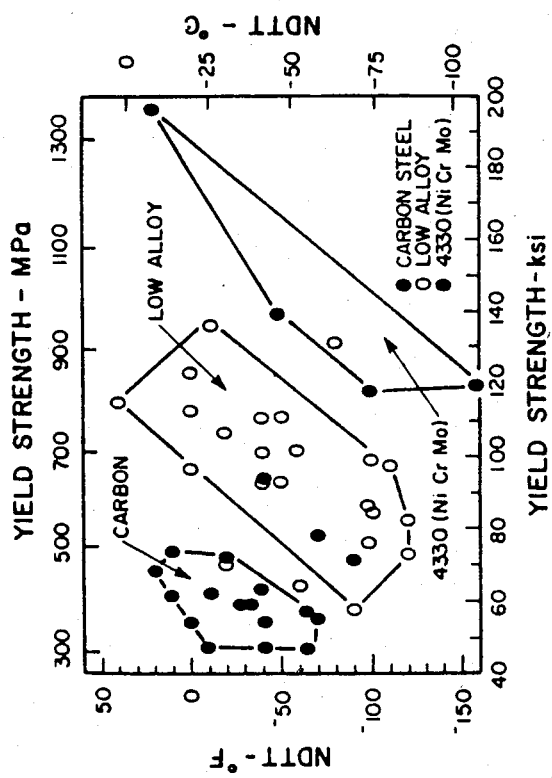
Fig. 8P The NDTT and yield strength of quenched and tempered commercial cast steels [1.5-in. (38-mm) section] (5).

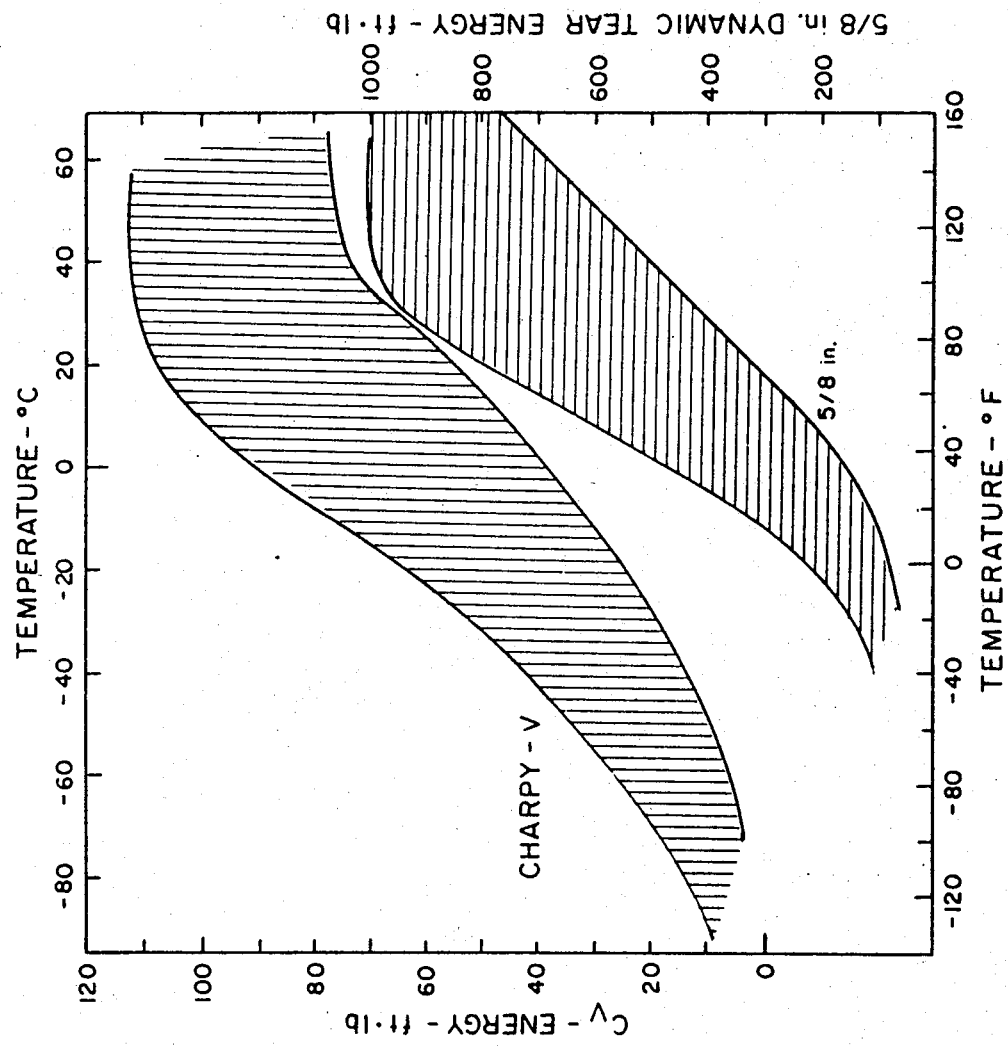
Fig. 8R Scatter bands of Charpy V-notch and dynamic tear energy transition curves from several heats of C-Mn steel of ASTM A216, type WCC. Values represent surface and center locations of 3-in. (76-mm) plate castings (1). Conversion: 1 ft·lb = 1.356 J.

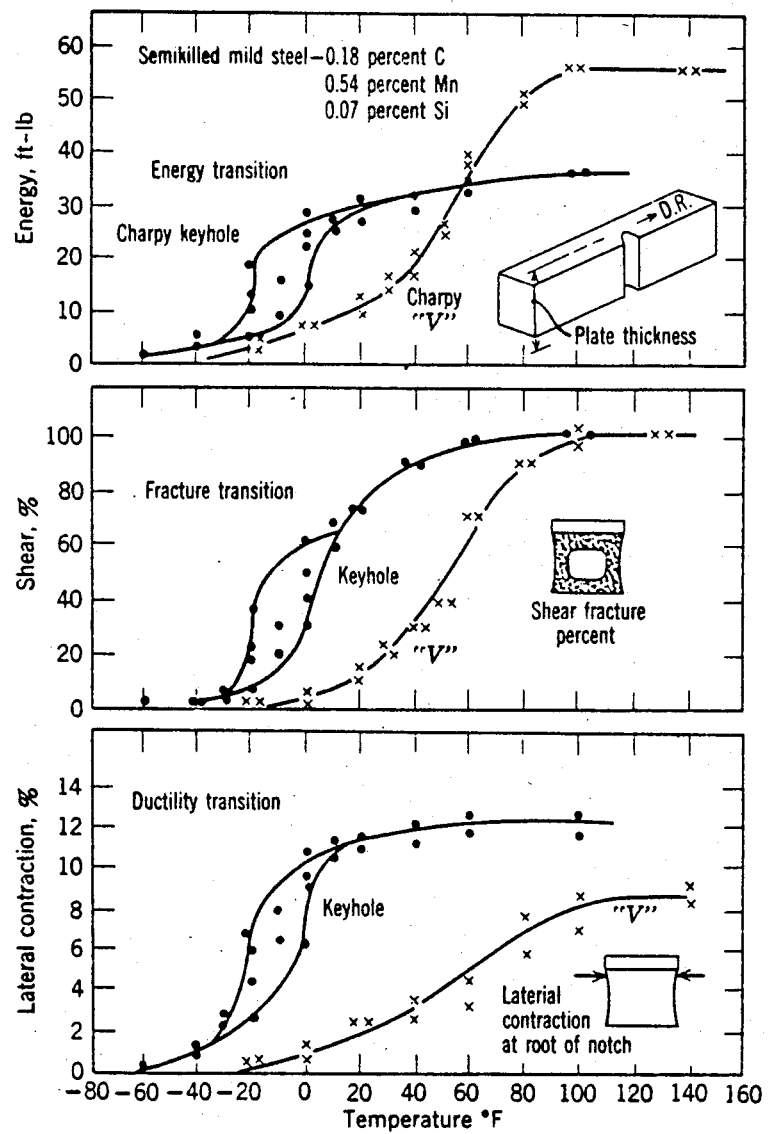
Figure 8S Transition-temperature curves based on energy absorbed, fracture appearance, and notch ductility (from W. S. Pellini, *ASTM Spec. Tech. Publ.*, 158, 1954, p. 222).

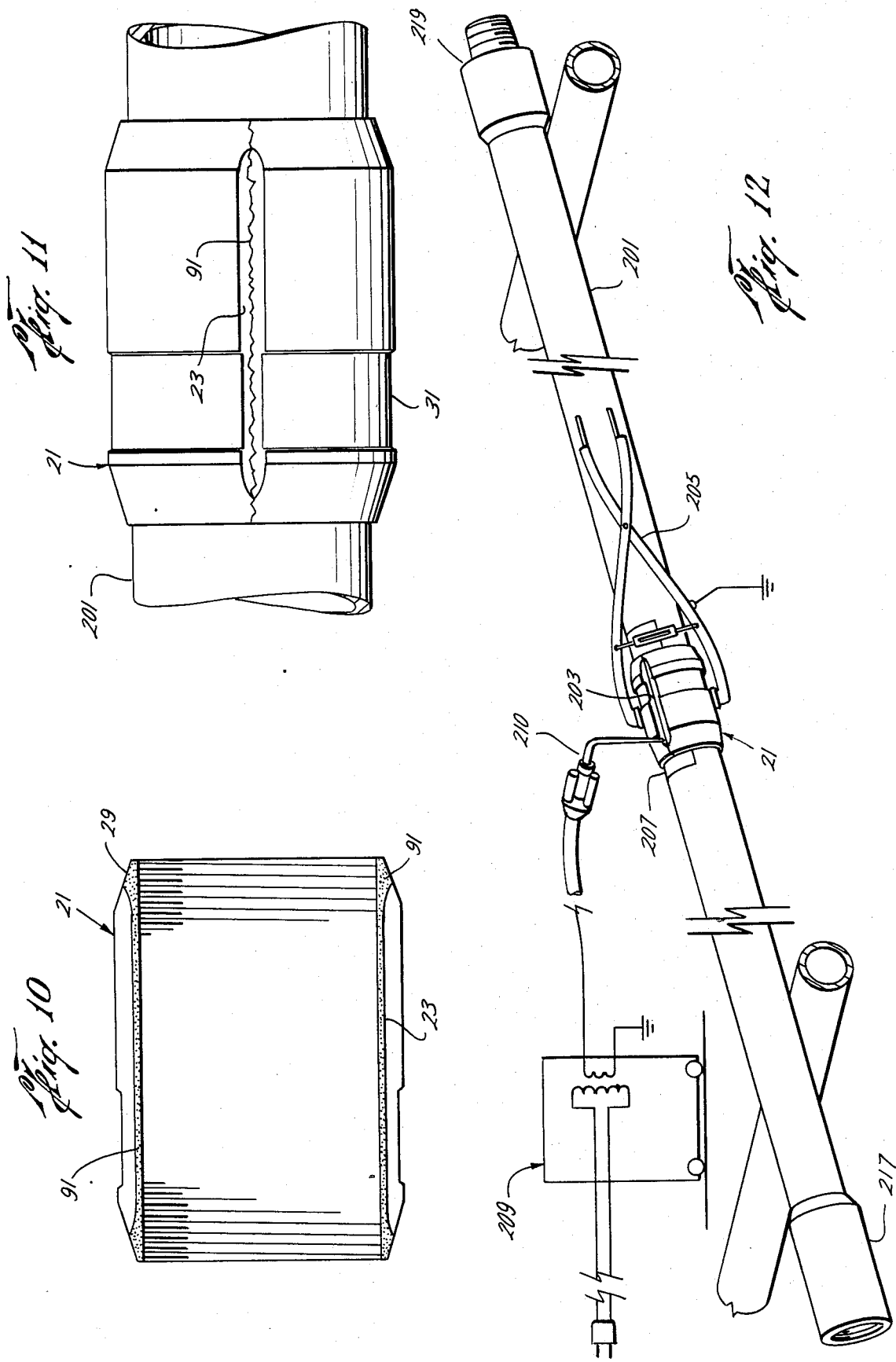

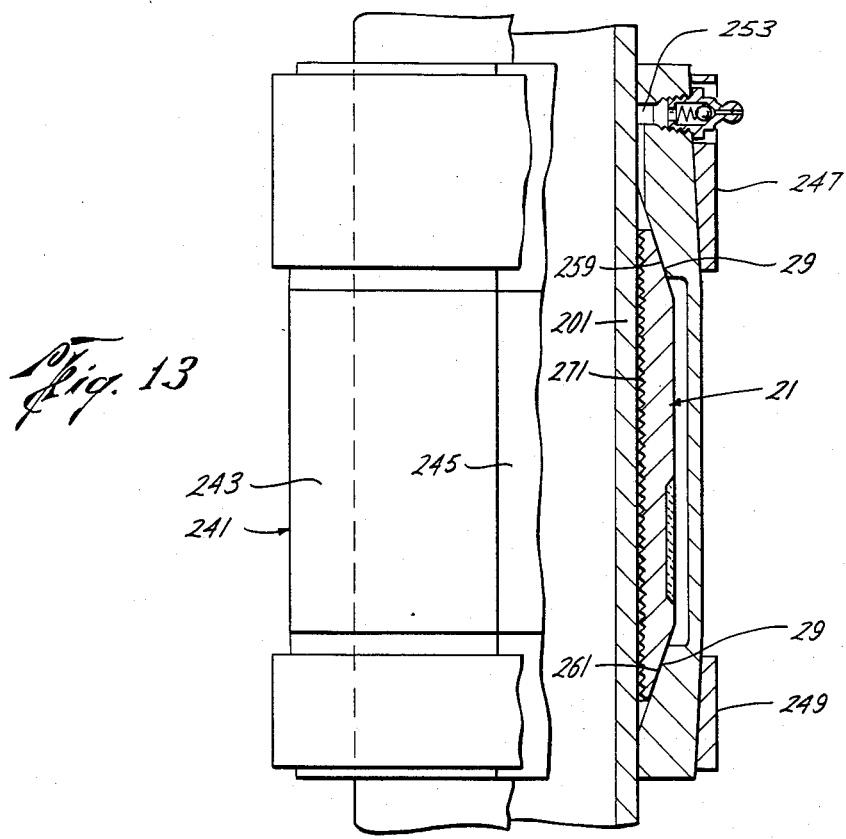
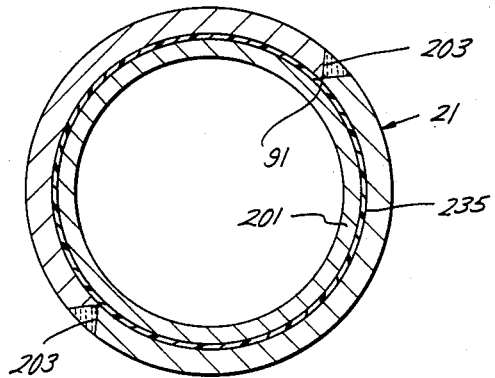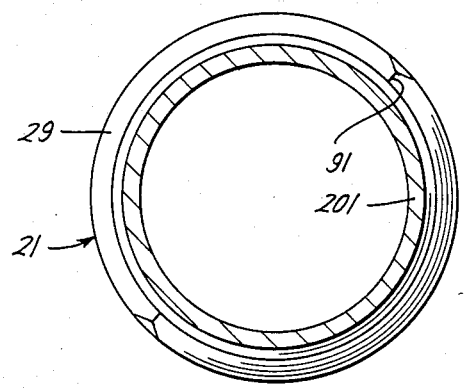

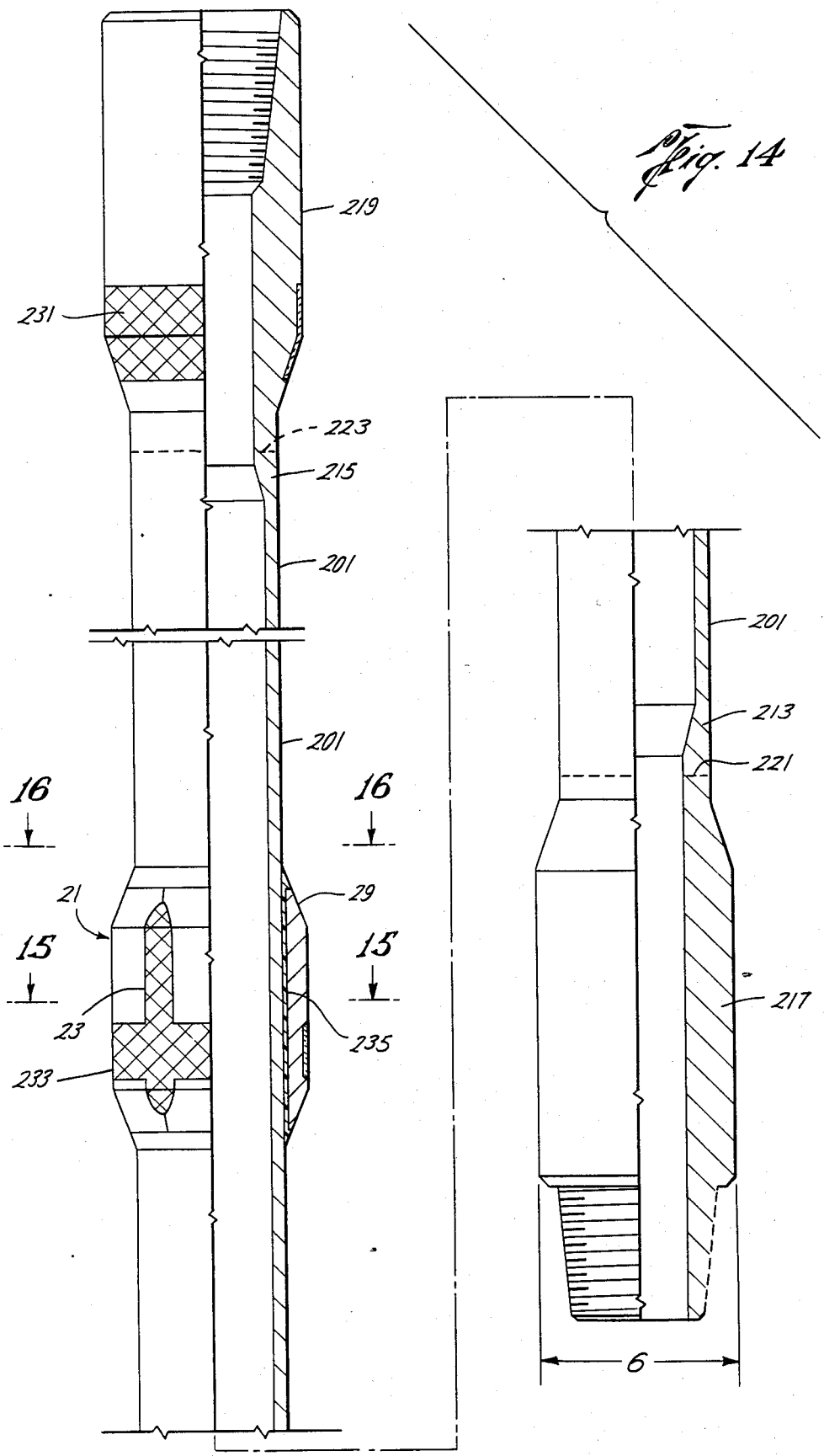

METHOD OF MAKING A DRILL PIPE WEAR SLEEVE ASSEMBLY AND PRODUCT THEREOF

CROSS-REFERENCES TO RELATED APPLICATIONS

This application is a continuation-in-part of application Ser. No. 197,057 filed 10-14-80, now abandoned, which is a continuation of application Ser. No. 10,235, filed 2-8-79, now abandoned, which was a continuation-in-part of application Ser. No. 818,672, filed 7-25-77, now U.S. Pat. No. 4,146,060. See also application Ser. No. 183,290, filed 9-2-80, now abandoned, a division of Ser. No. 10,235, and U.S. Pat. No. 4,171,560, a division of U.S. Pat. No. 4,146,060. The disclosures of U.S. Pat. Nos. 4,146,060 and 4,171,560 are incorporated herein by reference.

BACKGROUND OF THE INVENTION

This invention relates to earth boring by the rotary system and more particularly to a length of drill pipe having a wear sleeve thereabout in between the tool joints at the ends thereof, and to a method of attaching the wear sleeve to the drill pipe tube that extends between the tool joints.

Heretofore it has been disclosed in the aforementioned U.S. Pat. Nos.: 4,146,060-Garrett, 4,171,560-Garrett, that a one-piece homogeneously integral wear sleeve may be applied to the drill pipe tube prior to the attachment of the second tool joint to an end thereof. However, in the case of, e.g., used, drill pipe to which tool joints have already been welded, one at each end, this method is inapplicable unless a tool joint, e.g., one that is worn out, is cut off and replaced.

It is also known to split a wear sleeve prior to its attachment to a drill pipe tube so that the sleeve can be attached to the drill pipe tube after both tool joints have been attached. Prior U.S. patents showing various modes of attaching split wear sleeves to the drill pipe tube are discussed in the aforementioned Garrett patents.

One problem encountered with previously known split wear sleeves has been the difficulty in aligning the two segments of the split wear sleeve.

Another problem lies in the need, when welding the segments together, to bridge the gap between the segments to prevent weld metal penetrating the annulus between sleeve and tube. Such penetration would possibly damage the tube, interfere with flow of adhesive between tube and sleeve during attachment of the sleeve to the tube, and create stress risers where the weld metal engaged the tube.

Heretofore the two segments have usually been formed from a single piece sleeve which is sawed in half, leaving two gaps each a saw width wide, some type of consumable support sleeve or liner being placed inside the sleeve prior to welding the two segments together. Also, it is known to forge the two segments and to form lip and rabbet joints at the junctions of the segments, the overlapping lips serving to keep weld metal away from the drill pipe tube. Such construction is fairly expensive and the problem of alignment of the segments remains.

Summary of the Invention: (Numbers in parentheses refer to following notes).

According to the present invention, a steel wear sleeve is machined to the desired inner and outer diameters. The sleeve is then broken apart into parts of such size that they can be placed about a drill pipe tube, e.g., two semi cylindrical halves. Steps are taken to minimize or prevent plastic deformation of the two halves, both adjacent to the breaks and overall, whereby the parts can be fitted together after being placed about a drill pipe tube and, after reintegration, will be substantially round. Preferably, substantially brittle fracture (1), (2), (3) is achieved at both breaks.

First of all, diametrically opposed longitudinal external grooves are cut in the sleeve where it is to be segmented, the grooves penetrating nearly to the inner periphery of the sleeve, e.g. greater than fifty percent of the radial thickness of the sleeve, leaving only relatively thin webs connecting the segments.

The grooves provide sleeve portions of reduced cross-section thereby reducing the hoop tension required for parting, insuring that parting takes place where desired, e.g., in planes at diametrically opposite sides of the sleeve, and that parting at the grooves occurs prior to the remainder of the sleeve being loaded in excess of yield strength which would cause overall plastic deformation of the two halves, and that any yield at the breaks will be small because the breaks will occur at low stress values corresponding to lower values of plastic yield. The grooves provide stress concentrations (4) further facilitating parting. The grooves restrain plastic deformation, (5) thereby encouraging brittle fracture. The grooves provide space between the adjacent halves of the sleeve where weld metal can be inserted to join the halves together without forming an excessively radially protuberant weld joint. By scratching the bottoms of the grooves even greater stress concentration may be achieved in materials of high tensile strength to further encourage brittle fracture and localize failure at the desired planes (6).

Secondly, preparatory to parting, the sleeve is cooled, thereby to increase its notch sensitivity (7), and increase the unit yield strength (8) which promotes brittle failure (9), (10). To the same end, martensitic steel is preferred for the material of the wear sleeve (11). The sleeve is cooled to below the ductile-brittle transition temperature (12). The transition temperature depends on the heat treatment (13) and composition (14), (15) of the particular steel (15). For 1040 steel the transition temperature (start of lower shelf level) may be from zero to minus 20 degrees Fahrenheit; for 1020 bar stock it may be from minus 150 to minus 225 degrees Fahrenheit. Nil ductility temperature (16), crack arrest, dynamic tear, and drop weight tear tests (17) may also be used as a criterion for how low to cool the sleeve. Actually, there is quite a scatter to the results of such tests (18). Furthermore, test results depend greatly on the thickness of the specimen and the length of the crack (19). For best results, tests should be made with a sample of the material to be employed for the sleeve and of the same groove length, shape, thickness and history, or in other words, a test with the actual sleeve. A preferred test would be one that determines the temperature of minimum shear fracture (20). Preferably, the sleeve is cooled to an even lower temperature, In an actual case a sleeve of 1020 bar stock was cooled in liquid nitrogen at atmospheric pressure, to a temperature, e.g., of minus 195 degrees Centrigrade, (minus 320 degrees, Fahrenheit), thereby to fully, temporarily embrittle the metal of the sleeve.

Thirdly, the sleeve is parted by impact loading, thereby to raise the ductile-brittle transition temperature (2), (6), (11) and facilitate a greater degree of brittle fracture. To this end the cold sleeve is placed over an expander (e.g., a split wedge ring having a wedge cone therein) and broken apart into segments by forcing the cone into the ring. The force could be applied gradually, as in a hydraulic press (21), but preferably is applied suddenly, e.g., with a sledge hammer, thereby to reduce the time for yielding to occur by causing achievement of fracture stress in a very short period of time. Also, because the yield strength of the sleeve is greater with respect to impact loads and with low temperature, brittle failure will occur before any yield. The sleeve will fracture along the longitudinal grooves.

The sleeve could be cooled in situ while in position about the expander, if desired.

After fracture, the segments are preferably allowed to warm, e.g., to room temperature, e.g. 20 degrees Centigrade or whatever the ambient temperature of the shop may be, or any temperature consistent with ease of handling and preferably above the embrittlement temperature.

The segments of the fractured sleeve are then placed about a drill pipe tube and, according to the preferred embodiment where substantially brittle or low yield fractures are achieved, it will be found that they fit together perfectly like the broken pieces of a china cup. This insures that the segments are properly aligned and leaves no gap between the segments for weld metal to penetrate to the pipe-sleeve annulus. It is preferred that there be no pieces broken out at the fracture edges, which might allow weld metal to penetrate to the pipe. For the the same reason, in the case of less than brittle fracture, whiskering and other distortion preventing close approach of the two segments along the parting line is to be avoided.

The segments are then welded together by depositing weld metal in the longitudinal grooves. If desired, a disposable liner may be employed inside of the sleeve during welding to hold the segments in position and protect the tube in case the thin edges of the sleeve adjacent the fracture are melted away accidentally during the welding step.

The weld integrated fractured sleeve is then secured to the drill pipe tube with adhesive cement, e.g., epoxy resin; this may, for example, be done in the manner set forth in the aforementioned Garrett patents, the disclosures of which are incorporated herein by reference, or, preferably, as set forth in the contemporaneous U.S. patent application of Gerry R. Lavendar and James Oscar Chance entitled Wear Sleeve—Drill Pipe Assembly, assigned to the same assignee as the present application, now U.S. Pat. No. 4,434,125, issued Feb. 28, 1984.

Further features of the invention and objects and advantages thereof will appear from the following description of a preferred embodiment of the invention, reference being made to the accompanying drawings.

BRIEF DESCRIPTION OF THE DRAWINGS

FIG. 1 is an axial section of a wear sleeve, prior to fracture, with longitudinal weld grooves machined therein in accordance with the invention.

FIG. 2 is an end view of the sleeve shown in FIG. 1.

FIG. 2A is a fragmentary view similar to FIG. 2 showing a modification.

FIG. 3 is an isometric view of the sleeve, showing one of the longitudinal weld grooves.

FIG. 4 is an isometric view of the split wedge ring.

FIG. 5 is an isometric view of the wedge cone used with the split wedge ring shown in FIG. 4.

FIG. 6 is an isometric view showing the wear sleeve about an expander with the wedge cone in place.

FIG. 7 is an isometric view partly in section, showing the wear sleeve about an expander with the wedge cone in place.

FIGS. 8A–8S are graphs.

FIG. 10 is an axial view of a segment of the fractured wear sleeve.

FIG. 11 is an elevation showing a drill pipe tube with a multisegment sleeve about a drill pipe tube, preparatory to the segments being welded together in accordance with the invention.

FIG. 12 is a pictorial view illustrating the welding operation.

FIG. 13 is an axial half section through a portion of the tube of the drill pipe with the welded sleeve in position thereon and molding apparatus thereabout, representing a stage in the manufacture of the drill pipe prior to introduction of plastic cement to the mold for securement of the wear belt sleeve.

FIG. 14 is a half section through a length of drill pipe incorporating a wear sleeve in accordance with the invention.

FIGS. 15 and 16 are sections taken at planes indicated at 15—15 and 16—16 in FIG. 14.

Figure 9A:
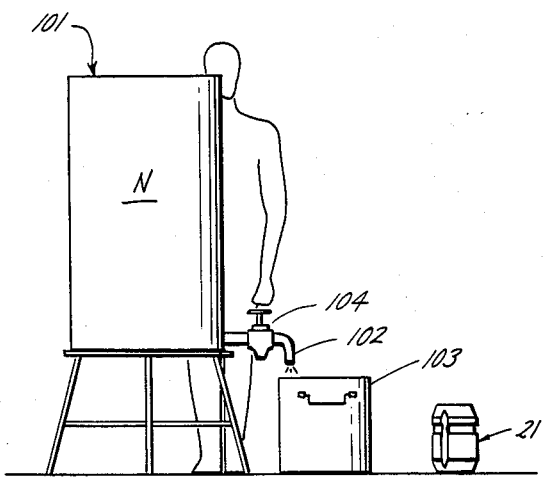
FIG. 9 is a series of pictorial views illustrating the cooling of the wear sleeve and fracturing of the wear sleeve on the expander.

The drawings, except for the schematics, are to scale, and the conventions of the United States Patent and Trademark Office in patent cases are employed for designation of the materials employed, from which it will be seen that everything is made of metal, e.g. steel, except for the tungsten carbide wear band and the adhesive plastics material between the wear sleeve and tube of a drill pipe, and the elastomer or other packing material used for the seals when molding the adhesive plactics material between the wear sleeve and tube.

DESCRIPTION OF THE PREFERRED EMBODIMENT

Referring to FIGS. 1–3 there is shown a steel wear sleeve 21 prior to fracture and application on a drill pipe. The sleeve has two longitudinal external grooves 23 penetrating nearly to the inner periphery of the sleeve. As best shown in FIG. 2, the grooves are triangular in section to facilitate filling with weld metal after the sleeve has been fractured. A fillet 24 is provided at the bottom of each groove to avoid a narrow crack which might be hard to fill with weld metal.

As shown in FIG. 2A, a scratch 25 may be provided in the bottom of fillet 24 further to insure brittle failure at the desired location. The scratch will be omitted where the material is such that the scratch will not be helpful.

The grooves are located 180° apart on the circumference of the wear sleeve. The inner periphery 27 of the sleeve is threaded to provide a mechanical interlock between the sleeve and securement layer to supplement the adhesion of the cement used for securement of the sleeve to the drill pipe, as will be described further.

The wear sleeve has conical bevels 29 around its ends to ease it past protuberances from the sides of a well bore when the drill pipe is being raised or lowered. This reduces impact shear stresses on the securement layer and prevents the wear sleeve from being knocked loose.

The ends 24 of the grooves 23 are shallower than the portion between the ends, so that the bevels 29 will have larger areas uninterrupted by grooves 23, such uninterrupted areas providing sealing surfaces for the mold used in cementing the sleeve to a drill pipe tube. The groove ends 24 are arcuate in longitudinal section to avoid stress concentration.

Annular groove 31 is provided adjacent the lower end of the sleeve to receive hard metal after the sleeve has been assembled about a drill pipe tube.

Referring to FIGS. 4–7, there is shown the expander employed in fracturing the wear sleeve. The expander comprises a split wedge ring 61 and a wedge cone or mandrel 81.

As shown in FIG. 4, split wedge ring 61 is divided axially into four equal segments 63. The segments 63 of split wedge ring 61 are held in place by elastomeric O-rings 67, 68 (shown only in FIG. 7) located in a series of annular grooves 65, 66 around the upper portion 69 and base 71 of split wedge ring 61.

Split wedge ring 61 is tubular, with a flange 71 at its lower end to support sleeve 21. To provide a stable base, flange 71 has a flat bottom 72. Its inner and outer peripheries are circular. It is interiorly tapered beginning just above the base flange and flaring upwardly. A taper angle of, e.g., 5 degrees is suitable.

Wedge cone 81, shown in FIG. 5, has a round, tapered outer surface 83 which fits slidably into the inner portion of the split wedge ring, as shown in FIG. 7. The cone taper angle is the same as that of the ring. Wedge cone 81 has a head 85, having a flat upper surface 87. The outer periphery of head 85 is cylindrical. Between head 85 and tapered surface 83 is a cylindrical neck 89; this provides a convenient finger grip and also a tool run out in the machining of tapered surface 83.

FIGS. 6 and 7 show wear sleeve 21 over split wedge ring 61, with wedge cone 81 in place inside the split wedge ring. The wear sleeve rests on base 71 of split wedge ring 61. The space 89 between the outer diameter of the split wedge ring and the inner diameter of the wear sleeve is just enough to allow the sleeve to slip down easily over the wedge ring. The sleeve fits snugly about O-rings 67, which are slightly protuberant from grooves 65.

As shown in FIGS. 6 and 7, when cone 83 is resting in wedge ring 61, its tapered portion extends up out of the wedge ring by about two inches, so that upon the cone being driven down into the ring, a circumferential expansion of about $(2)(2)(\tan 5 \deg)(\pi) = 1.1$ inch is effected. This is more than enough to fracture a sleeve.

A sledge hammer, e.g. accelerated with a force of fifty pounds over a distance of five feet and brought to rest by impacting head 85 of cone 83 will exert a force during deceleration to drive the cone part way into wedge ring. The sleeve will fracture prior to the cone being driven all the way in because of the embrittlement of the sleeve by the grooves, the impact loading, and the low temperature, as discussed in connection with FIGS. 8A–8S, referred to in the notes to the Summary of the Invention.

Preferably the sleeve is cooled to the temperature of minimum shear fracture (see FIGS. 8B and 8S) for the particular sleeve, i.e., the temperature from which further cooling does not decrease the percentage shear fracture. Such percentage may be around 5% depending on the circumstances. Minimum shear temperature will depend on the sleeve material, which includes heat and work history, sleeve thickness and configuration, groove geometry and length, and strain rate, as well as the chemical composition and micro and macro structure. FIGS. 8L and 8S show a degree of correlation between "transition temperatures" as determined from absorbed energy tests and lateral contraction compared with those determined from shear fracture percentage graphs, from which fact one may assume with some degree of correctness that brittle-ductile transition temperatures as determined from standard toughness tests may be employed to determine the temperature to which a particular sleeve need be cooled, making allowance for differences between test specimens and actual wear sleeves.

FIG. 8K shows the results of Izod impact tests on 1020 bar stock steel, from which it will be seen that the lower shelf begins at about −200 degrees Fahrenheit. Wear sleeves in accordance with the invention have been made using 1020 tubing in the as rolled condition, which means without any post rolling heat treatment, neither quenching and tempering, normalizing and tempering, nor annealing and experiments (20) indicate that a temperature of −109 degrees Fahrenheit was not low enough whereas −320 degrees Fahrenheit was satisfactory. It is possible that increasing the thickness at the bottom of the sleeve from $\frac{1}{8}$ inch (Figures)=3.17 mm would elevate the ductile-brittle transition temperature (Cf. FIG. 8L).

FIG. 8H shows the variation of Charpy V notch fracture energy versus temperature for 0.30% carbon steel following various heat treatments, from which it will be seen that for the more ductile material there is no obvious transition temperature so that some artificially defined transition temperature is often employed, e.g., 20 Joule fracture energy for Charpy V notch specimens, or 50% shear fracture, etc. In the present case, minimum shear fracture or 5% shear fracture would be appropriate.

FIG. 9 shows the method of cooling and fracturing wear sleeve 21. As shown in FIG. 9(a), a tank of liquid nitrogen 101 is positioned above a container 103 so that the container 103 can be filled with the liquid nitrogen via outlet pipe 102 and valve 104. The container may be filled to about three-quarters full.

Figure 9B:
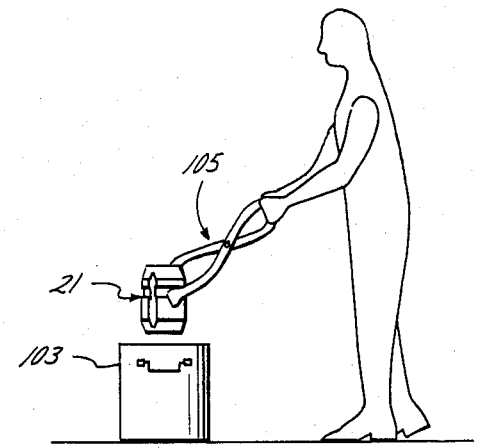
Figure 9C:
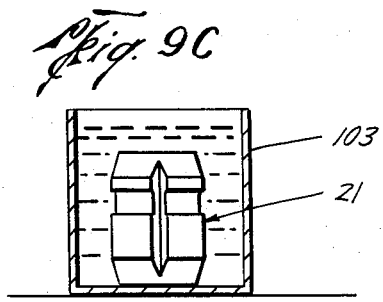

FIG. 9(b) shows wear sleeve 21 being placed inside the container 103 by means of cold-insulated tongs 105. The wear sleeve is kept in the liquid nitrogen in container 103 for five minutes or until the nitrogen stops boiling. The wear sleeve thus cools to a temperature below the boiling point of nitrogen, minus 195 degrees C., which is below the brittle-ductile transition temperature of the particular steel alloy used for the wear sleeve.

Figure 9D:
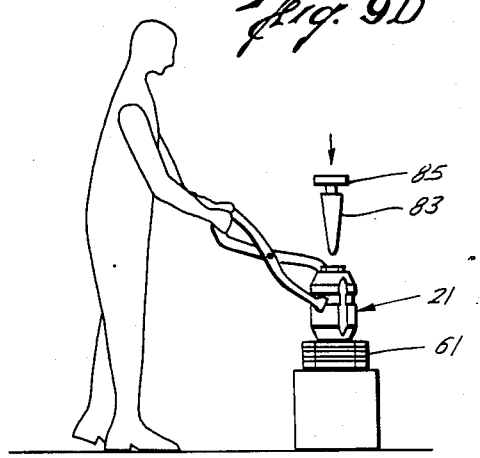
Figure 9E:
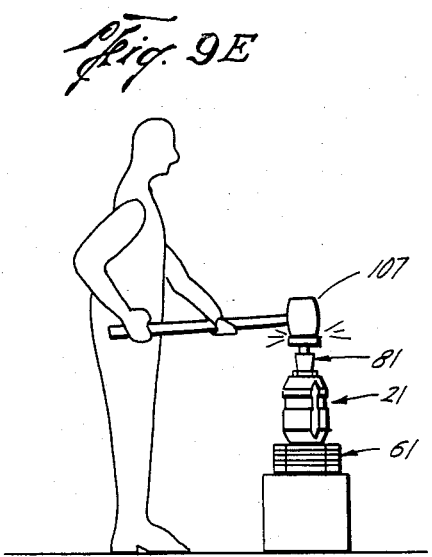

The cooled wear sleeve is removed from the liquid nitrogen and placed over expander 61–81 as shown in FIG. 9(d). The wedge cone is driven down within the split wedge ring by a downward force from hammer 107 as shown in FIG. 9(e). The downward force on the wedge cone causes the four sections of the split wedge ring to expand. The O-rings 67 within grooves 65 on the split wedge ring allow this expansion. The wear sleeve, made brittle by cooling in liquid nitrogen, fractures along the longitudinal grooves 23 when the split wedge ring expands.

FIG. 10 shows one segment of fractured wear sleeve 21. As a result of the fracturing method the fractured edges 91 of the wear sleeve are clean, i.e., free of plastically stretched and deformed portions, and deviate no more than about the width of fillet 24 from a straight line. The segments of wear sleeve 21 are allowed to return to room temperature before welding. The segments of wear sleeve 21 are placed around the drill pipe tube 201, as shown in FIG. 11, to be welded together along the longitudinal groove 23, at weld line 203 as shown in FIGS. 12–14.

As best shown in FIGS. 15 and 16 even after the wear sleeve is completely assembled upon a drill pipe tube, the method of its assembly is evident by the fracture lines 91 still visible at the tapered ends of the sleeve (FIG. 16) and also visible between the ends if a sleeve is cut through transversely as shown in FIG. 15, and if the sleeve is cut off the tube and the plastics cement cleared away, the fracture will be visible along the inner periphery of the sleeve. Therefore, the product of the invention is readily identifiable.

Referring now to FIG. 12, there is shown the method of welding wear sleeve 21. The two segments of wear sleeve 21, now at room temperature, are held together around drill pipe tube 201 midway between pin and box tool joint members 217, 219, by a clamp 205.

A metal liner 207 of copper is situated between drill pipe tube 201 and the segments of wear sleeve 21 to protect the drill pipe tube during the welding process. Weld metal does not adhere to the copper; also the copper transmits heat and prevents burning the pipe. Liner 207 is removed after the welding is finished. The segments of the wear sleeve are welded together by means of a welding apparatus 209 along weld lines 203 in longitudinal grooves 23. An electric arc welding apparatus is shown, including weld rod 210. The fractured edges 91 of the fractured wear sleeve fit together without gaps because of the clean break obtained through the fracturing process. Because the edges are slightly irregular and must be fitted together, nearly perfect registry is achieved.

Referring now to FIG. 13, there is shown a method of securing weld integrated wear sleeve 21 to drill pipe tube 201. An annular mold 241 split diametrally into two parts 243, 245 is positioned about the wear sleeve and held in place by clamp rings 247, 249. The inner periphery of mold 241 is conically tapered at 259, 261 at the same taper angle as the bevels 29 of wear sleeve 21, so that the mold fits snugly about the ends of the wear sleeve. An adhesive, high polymer material, e.g. an epoxy, phenolic, or epoxy-phenolic, is injected under pressure through port 253 to fill space 271 between the wear sleeve and drill pipe tube. Details of the securement method are disclosed in the aforementioned U.S. Pat. No. 4,171,560 to Garrett, the disclosure of which is incorporated herein by reference.

Referring now to FIGS. 14–16, there is shown the completed drill pipe 201 with wear sleeve 21 attached. The ends of drill pipe tube 201 are provided with weld upsets 213, 215. To upsets 213 and 215 are welded pin and box tool joint members 217, 219. Preferably the welds are effected by flash welding or friction or inertia welding. The weld areas are indicated by the broken lines 221,223 at the ends of upsets 213, 215. Since the wear sleeve is split before it is assembled about the drill pipe tube, the tool joints can be welded to the tube before the sleeve is affixed thereto. This is especially important in the case of used drill pipe to which it is desired to affix a wear sleeve.

About the outer periphery of the pipe midway between the tool joint members is secured wear sleeve 21. Wear sleeve 21 and the box tool joint member may be provided on their outer peripheries with suitable hard facing material such as bands 231, 233, or inserts of tungsten carbide. Such hard facing is welded into annular groove 31. When the two segments of the wear sleeve are welded together, the welder is careful not to fill groove 31 as welds 213 are placed in axial groove 23. The welder is also careful to keep the outer surface of weld 203 close to flush with the outer periphery of the sleeve to avoid any subsequent grinding for smoothing it off. Initially, the two segments of the sleeve are tack welded together at both grooves 23, so that the clamp can be removed. Thereafter weld beads are laid down in each groove until it is full.

Wear sleeve 21 is secured to pipe 201 by mounting means comprising an annular layer 235 of an adhesive high polymer material which fills space 271 (shown in FIG. 12) between the sleeve and pipe.

While a preferred embodiment of the invention has been shown and described, modifications thereof can be made by one skilled in the art without departing from the spirit of the invention. For example, wear sleeve 21 need not be midway between the tool joints, and more than one wear sleeve can be employed, and other modes of adhering or affixing the wear sleeve to the drill pipe tube may be employed.

NOTES TO SUMMARY OF THE INVENTION (1) BRITTLE FRACTURE

ASTM Standard E 23-72 (reapproved 1978) on "Standard Methods for Notched Bar Impact Testing of Metallic Materials", Appendix Note A 1.2 Notch Effect states:

"In cases of *brittle fracture*, the cohesive strength is exceeded before significant plastic deformation occurs and the *fracture appears crystalline*. In cases of the ductile or shear type of failure, considerable deformation precedes the final fracture and the broken surface appears fibrous instead of crystalline. In intermediate cases, the fracture comes after a moderate amount of deformation and is part crystalline and part fibrous in appearance."

(2) BRITTLE FRACTURE

Brittle fracture is discussed in "The Structure and Properties of Materials, Volume III, Mechanical behavior" by H. W. Hayden, William G. Moffatt and John Wulff, published 1965 by Jon Wiley & Sons, Inc. At page 143, it is said:

"Fracture is the separation of a body under stress into two or more parts and is usually characterized as either brittle or ductile. *Brittle fracture* occurs by the very rapid propagation of a crack after *little or no plastic deformation*. In crystalline materials, brittle fracture usually proceeds along characteristic crystallographic planes called cleavage planes, and a brittle fracture surface in a polycrystalline material has a *granular appearance*. * * * A ductile fracture has a characteristic dull, fibrous appearance. * * * In BCC [steel] transition metals, the presence of *notches*, or use at *low temperatures* or use under *high rates of strain* can cause a transition from ductile to brittle fracture. In any such materials, ductile fracture is characterized by large energy absorption prior to failure, whereas brittle fracture requires little energy absorption".

(3) BRITTLE FRACTURE

Some authorities define brittle to mean having a low level of fracture *energy* or limited crack tip *plasticity*, others as the property of material fracturing in large measure by *cleavage*, but in the present case brittle has reference to the distortion free nature of the fracture surfaces, e.g. granular and non-fibrous, which should fit together again when the wear sleeve parts are placed together about a pipe. In this regard attention is directed to the comments at page 298 et seq of Deformation and Fracture Mechanics of Engineering Materials by Richard Hertzberg.

"The Charpy specimen *** and associated test procedure provides a relatively severe test of material toughness. The notched sample is loaded at very high strain rates because the material must absorb the impact of a falling pendulum and is tested over a range of temperatures. Considerable data can be obtained from the impact machine reading and from examination of the broken sample.

"First, the amount of energy absorbed by the notched Charpy bar can be measured by the maximum height to which the pendulum rises after breaking the sample ***. If a typical 325-J (240-ft-lb)* machine were used, the extreme final positions of the pendulum would be either at the same height of the pendulum before it was released (indicating no energy loss in breaking the sample), or at the bottom of its travel (indicating that the specimen absorbed the full 325 joules of energy). The dial *** provides a direct readout of the energy absorbed by the sample. Typical impact energy versus test temperature for several materials is plotted in FIG. 9.5 [FIG. 8A hereof]. It is clearly evident from this plot that some materials show a marked change in energy absorption when a wide range of temperatures is examined. In fact, this sudden shift or transition in energy absorption with temperature has suggested to engineers the possibility of designing structural components with an operating temperature above which the component would not be expected to fail.

"The effect of temperature on the energy to fracture has been related in low-strength ferritic steels to a change in the microscopic fracture mechanism; cleavage at low temperatures and void coalescence at high temperatures. The onset of cleavage and brittle behavior in low-strength ferritic steels is so closely related that "cleavage" and "brittle" often are used synonymously in the fracture literature. This is unfortunate since, in Chapter Seven, brittle is defined as *a low level of fracture energy or limited crack tip plasticity*, while cleavage is described as a failure micro-mechanism. Confusion arises since brittle behavior can occur without cleavage, as in the fracture of high-strength aluminum alloys; alternately, you can have 4% elongation (reflecting moderate energy absorption) in a tungsten-25 a/o rhenium alloy specimen and still have a cleavage fracture. Since a direct correlation does not always exist between a given fracture mechanism and the magnitude of fracture energy, it is best to treat the two terms separately.

"Unless the fracture energy changes discontinuously at a given temperature, some criterion must be established to define the "transition temperature." Should it be defined at the 13.5, 20, or 27 J (10, 15, or 20 ft-lb)* level as it is sometimes done or at some fraction of the maximum or shelf energy? The answer depends on how well the defined transition temperature agrees with the service experience of the structural component under study. Unfortunately, the transition temperature criterion based on such a specific energy level is not constant but varies with material. Specifically, Gross has found for several steels with strengths in the range of 415 to 965 MPa that the appropriate energy level for the transition temperature criterion should increase with increasing strength.

"The same problem arises when the transition temperature is estimated from other measurements. For example, if the amount of lateral expansion on the compression side of the bar is measured, it is found that it, too, undergoes a transition from small values at low temperature to large values at high temperature. (This increase in observed plastic deformation is consistent with the absorbed energy-temperature trend.) Whether the correct transition temperature conforms to an absolute or relative contraction depends on the material.

"Finally, transitional behavior is found when the amount of fibrous or cleavage fracture on the fracture surface is plotted against temperature. A typical series of fracture surfaces produced at different temperatures is shown in FIG. 9.7a [FIG. 8B hereof]. Here again, the appropriate percentage of cleavage or fibrous fracture (based on comparison with a standard chart such as in FIG. 9.7b [FIG. 8B hereof] or measured directly as in FIG. 9.7c [FIG. 8B hereof] to use to define the transition temperature will depend on the material as well as other factors. To make matters worse, transition temperatures based on either energy absorption, ductility, or fracture appearance criteria do not agree even for the same material. As shown in Table 9.1. the transition temperature defined by a 20 J energy criterion or by a 0.38 mm (15 mil) lateral expansion are in reasonably good agreement but are consistently lower than the 50% fibrous fracture transition temperature. Which transition temperature to use "is a puzzlement."

(4) STRESS CONCENTRATION

The subject of stress concentration and notch sensitivity is discussed by R. E. Peterson in "Stress Concentration Factors" published 1974 by John Wiley & Sons, Inc. Relative to stress concentration, it is said at p. 1:

"The elementary formulas used in design are based on members having a constant section or a section with gradual change of contour * * *. * * * The presence of * * * grooves * * * results in a modification of the simple stress distributions * * * localized high stresses occur as shown in FIG. 2 [FIG. 8C hereof]. This localization of high stress is known as stress concentration, measured by the stress concentration factor * * *".

(5) NOTCH ENCOURAGES BRITTLE FAILURE

At page 161 of The Structure and Properties of Materials", Vol. 3, supra, it is said:

"The importance of a notch in the impact test specimens is of significance in interpreting the origin of brittle failure. The notch provides a stress concentration and a constraint to plastic deformation at its tip. When a load is applied, the notched region is in a state of triaxial tension. Slip or ductile deformation, which requires shear, will be suppressed by such a state of stress. Thus a notched specimen can support a much higher level of true tensile stress than an unnotched one. As a notched specimen is loaded high enough in simple tension, the material at the notch will try to yield. It would like to do so shrinking inward in the plane perpendicular to the applied tensile stress. The metal lying above and below the notch [length of test specimen vertical] has not yielded and prevents yielding of the notched material. The latter is therefore subjected to three tensile stresses (triaxial). The first is the applied tensile stress, and the other two are induced horizontal tension stresses. If a mild steel tensile specimen were unnotched and subjected to the same applied true tensile stress as a notched one, it would yield at less than half the true tensile load sustained by the notched specimen. In the case of an ideally deep and sharp notch [e.g., a scratch], the true tensile stress necessary to cause yielding in a notched specimen is three times as high as that for an unnotched specimen. The notch thus provides plastic constraint. The triaxial state of stress that it induces restrains plastic deformation and favors *brittle fracture.*"

(6) NOTCH SENSITIVITY VS. STRENGTH

Again referring to Peterson on "Stress Concentration Factors", supra, with respect to Notch Sensitivity, it is said at pp. 9, 10:

"It is well known that the effect of a notch on the fatigue strength of a part varies considerably with material and notch geometry and is usually less than the effect that would be predicted by use of the stress concentration factor, which is a theoretical factor. This general phenomenon is denoted notch sensitivity. Notch sensitivity may be considered as a measure of the degree to which the theoretical effect is obtained. * * * Notch sensitivity values for radii approaching zero must still be studied. It is, however, well known that tiny holes and *scratches* do not result in a strength reduction corresponding to geometric factors; in fact, in steels of low tensile strength, the effect is often quite small. However, in high strength steels, the effect of tiny holes or *scratches* is more pronounced."

(7) NOTCH SENSITIVITY VS. TEMPERATURE

Referring again to Peterson on "Stress Concentration Factors", supra, at page 11, 13:

* * * "Under ordinary conditions a ductile member when loaded with a steady stress * * * does not suffer loss of strength due to presence of a notch. If the member is * * * subjected to *shock loading* or if the part is * * * subjected to * * * *low temperature,* * * * a ductile material may behave in the manner of a brittle material * * *. It is customary to apply the full Kt [stress concentration] factor in the design of members of brittle materials."

(8) YIELD STRESS VS. TEMPERATURE

At page 102 of Vol. III of "Structure of Materials", supra, it is said:

"The *stress required to initiate slip* in a pure and perfect single crystal, *the critical resolved shear stress,* is a constant for a material at a given temperature", and at page 103 it is said:

"FIG. 5.5 [FIG. 8D hereof] illustrates the *variation of critical resolved shear stress with temperature* for several materials; note that the difference in its magnitude *increases markedly at lower temperatures.*" [About 300 deg. K, the critical resolved shear stress for iron is seen to increase sharply with decreasing temperature.]

(9) YIELD STRESS VS. BRITTLENESS

At page 165 of Vol. III of "Structure of Materials", supra, it is said:

"In materials whose *yield stress increases* sharply *with* increasing strain rate or *decreasing temperature,* for example *low carbon steel,* the presence of notches and microcracks can *induce brittleness.*"

(10) YIELD STRENGTH VS. BRITTLENESS

According to Deformation and Fracture Mechanics of Engineering Materials by Richard W. Hertzberg, at page 297:

"To a first approximation plastic constraint associated with a biaxial or triaxial stress state at the crack tip will *elevate the entire stress-strain curve* and allow for a net section stress greater than the smooth bar tensile strength value. Recall from Chapter Seven that a 2½ to 3-fold increase in net section strength is possible in ductile materials that "notch strengthen" (FIG. 9.1) [FIG. 8E hereof]. On the other hand, in materials that have less ability for plastic deformation, the stress concentration at a notch root is not offset by the necessary degree of crack tip plasticity needed to blunt the crank tip. Consequently, the notch with its multiaxial stress state raises the local stress to a high level and suppresses what little plastic deformation capacity the material possesses, and brittle failure occurs (FIG. 9.2) [FIG. 8F hereof]." ["Notch strengthening" as used in the above text appears to refer to stiffening rather than an increase in ultimate strength.]

(11) YIELD STRENGTH OF BCC AND FCC MATERIALS VS. TEMPERATURE

At page 131 of Vol. III of "Structure of Materials", supra, with respect to plastic deformation, it is said:

"* * * both increasing the strain rate and decreasing the temperature raises the level of the tensile stress-strain curve. At *low temperatures* and high strain rates [impact] some BCC metals, such as *plain carbon steels,* molybdenum and tungsten, undergo such a large increase in *yield strength* that *cleavage* [brittle fracture] may occur before the generation of appreciable plastic flow.

"FCC metals, such as copper and aluminum, tend to exhibit a much less drastic increase in strength but [and] little if any reduction in ductility. They also show no abrupt decrease in impact energy absorption at low temperatures. For this reason, aluminum alloys and *austenitic* iron-nickel alloys are useful in low temperature applications." [The present invention preferably employs pearlitic/ferrite or other BCC steel.]

"Although the static stress-strain curve may drop very rapidly with increasing temperature, the percentage *increase in strength due to impact loading* is much greater at elevated temperatures than at low temperatures. * * * The strength of metals at elevated temperatures is greater under impact strain rates as compared to low strain rates. The high temperature impact stress-strain curve lies considerably below the room temperature slow strain rate curve as shown in FIG. 6.7" [actually 6.6; FIG. 8G hereof].

(12) DUCTILE-BRITTLE TRANSITION TEMPERATURES "The New Encyclopaedia Britannica" (15th Edition), published for Encyclopaedia Britannica, Inc. by Benton, in Macropedia Volume II, page 628, states:

"Some *materials vary in impact strength* at *different temperatures,* becoming very brittle when cold. Tests have shown that the *decrease in* material *strength* and elasticity is often quite abrupt at a certain temperature, which is called the *transition temperature* for that material." [Strength as used in the foregoing quotation refers to toughness. Although both ultimate strength and yield strength *increase* with cooling, the yield strength increases faster until yield strength approaches or exceeds cleavage strength, inducing brittle failure. Most failures are in part ductile, in part brittle, and since cooling increases the percentage of brittle fracture, the *energy required for impact fracture drops* with the lowering of the temperature].

(13) TRANSITION TEMPERATURE VS. HEAT TREATMENT

According to the Steel Castings Handbook, page 15-5, 6:

"*Strength-Toughness.* Several test methods exist to evaluate toughness of steel, or the resistance to sudden or brittle fracture. These include the Charpy V-notch impact test, the drop-weight test, the dynamic tear test and specialized procedures to determine plane strain fracture toughness. Results of all these tests are in use and will be reviewed here because each of these tests offers specific advantages that are unique to the test method as discussed in Chapter 4—Functional Considerations in Design.

"Charpy V-notch impact energy trends at room temperature in Figure * and * reveal the distinct effect of strength and heat treatment on toughness. Higher toughness is obtained when a steel is quenched and tempered rather than normalized and tempered. The effect of heat treatment and testing temperature on Charpy V-notch toughness is further illustrated in FIGS. 15-12 and 15-13 [FIGS. 8H and 8I hereof] for a carbon steel and for a low alloy cast 8630 steel. Quenching, followed by tempering, produces superior toughness as indicated by the shift of the impact energy transition curve to lower temperatures. The improved toughness of quenched and tempered steels is realized in spite of the higher strength level as evident for the cast 8630 low alloy steel (FIG. 15-13). (FIG 8-I hereof).

"Nil ductility transition temperatures, NDTT, from +100° F. (38° C.) as to low as −130° F. (−90° C.) have been recorded in tests on normalized and tempered cast carbon and low alloy steels in the yield strength range of 30 to 95 ksi (207 to 655 MPa) * * . Comparison of the data    shows the superior toughness values, at equal strength levels, which low alloy steels offer compared to carbon steels. When cast steels are quenched and tempered, the range of strength and of toughness is thus broadened *. NDTT values of as high as +50° F. (+10° C.) to as low as −160° F. (−107° C.) can be obtained in the yield strength range of 50 to 195 ksi (345 to 1345 MPa) depending on alloy selection *.

"An approximate relationship exists between the Charpy V-notch impact energy-temperature behavior and the NDTT. The NDTT frequently coincides with the energy transition temperature determined in Charpy V-notch tests. ***

"Dynamic tear impact energy results relate to strength, heat treatment, and alloy content in a manner similar to those of Charpy V-notch impact and drop-weight (NDT) tests."

(14) DUCTILE-BRITTLE TRANSITION TEMPERATURE VS. COMPOSITION

At page 12, Volume III of "Structure of Materials", supra, it is said with reference to impact tests that:

"* * * The impact test is often used to assess the *temperature of the transition from the ductile to brittle state which occurs as the temperature is lowered*. The transition temperature is also dependent on the shape of the notch of the specimen. For identical materials, the sharper the notch, the higher the apparent transition temperature. The results of impact tests for several materials are shown in FIG. 1.9" [FIG. 8J hereof].

(15) TRANSITION TEMPERATURE FOR 1020 STEEL

At page 390, Vol. 1, Metals Handbook-ASM, there is shown in FIG. 21*b* [FIG. 8K hereof] the variation of Izod Impact Energy with temperature for 1020 bar stock.

(16) NIL DUCTILITY TEMPERATURE

According to ANSI/ASTM E208-69 (Reapproved 1975) entitled "Standard Method For Conducting Drop-Weight Test To Determine Nil Ductility Transition Temperature of Ferritic Steels, paragraphs 3 and 4:

"3. *Significance*

3.1 The fracture-strength transitions of ferritic steels used in the notched condition are markedly affected by temperature. For a given "low" temperature, the size and acuity of the flaw (notch) determines the stress level required for initiation of brittle fracture. The significance of this test method is related to establishing that temperature, defined herein as the NDT temperature, at which the "small flaw" initiation curve, FIG. 1, falls to nominal yield strength stress levels with decreasing temperature, that is, the point marked NDT in FIG. 1.

3.2 Interpretations to other conditions required for fracture initiation may be made by the use of the generalized flaw-size, stress-temperature diagram shown in FIG. 1. The diagram was derived from a wide variety of tests, both fracture-initiation and fracture-arrest tests, as correlated with the NDT temperature established by the drop-weight test. Validation of the NDT concept has been documented by correlations with numerous service failures encountered in ship, pressure vessel, machinery component, forged, and cast steel applications.

4. *Definition*

4.1 *nil-ductility transition (NDT) temperature* the maximum temperature where a standard drop-weight specimen breaks when tested according to the provisions of this method.

(17) According to Deformation and Fracture Mechanics of Engineering Materials, by Richard Hertzberg, at page 304 et seq:

"In addition to transition temperature determinations from Charpy data, related critical temperatures may be obtained from other laboratory samples, such as the drop-weight and Robertson crack arrest test procedures. The drop-weight sample * consists of a flat plate, one surface of which contains a notched bead of brittle weld metal. After reaching a desired test temperature, the plate is placed in a holder, weld-bead face down, and impacted with a falling weight. Since a crack can begin to run at the base of the brittle weld-bead notch with very little energy requirement, the critical factor is whether the base plate can withstand this advancing crack and not break. According to ASTM Standard E208, the nil ductility temperature (NDT) is defined as that temperature below which the plate "breaks" * but above which it does not. Therefore, NDT reflects a go, no go condition *associated with a negligible level of ductility*.

"NDT tests results have been used in the design of structures made with lo-strength ferritic steels. For example, allowable minimum service temperatures (T$_{min}$) for structures containing sharp cracks have been defined (but may be a function of plate thickness): ****

"The Robertson sample is designed to measure a crack arrest condition. *** this sample contains a saw cut at one side of the plate and is subjected to a thermal gradient across the plate width such that the starter notch is at the lowest temperature, while the right side of the plate is considerably warner. After a uniform load is applied normal to the starter crack plane, the plate is impacted on the cold side, causing an unstable crack to grow from the cold starter notch root. The crack will run across the plate until it encounters a plate temperature at which the material offers too much resistance to further crack growth; this is defined as the crack arrest temperature (CAT). From such tests, it has been shown that CAT depends on the material, the magnitude of the applied stress, and the specimen thickness.

LIMITATIONS OF THE TRANSITION TEMPERATURE PHILOSOPHY

"It is important to recognize some limitations in the application of the transition temperature philosophy to component design. First, the absolute magnitude of the experimentally determined transition temperature, as defined by any of the previously described methods (energy absorbed, ductility, and fracture appearance), *depends on the thickness* of the specimen used in the test program. This is due to the potential for a plane strain-plane stress, stress state transition when sample thickness is varied. In evaluating this effect. McNicol found that the transition temperature in several steels, based on energy, ductility, and fracture appearance criteria, increased with increasing Charpy bar *thickness* t. FIG. 9.11 [FIG. 8L hereof] shows temperature-related changes in energy absorbed per 2.5-mm sample thickness and percent shear fracture as a function of sample thickness for A283, a hot rolled carbon manganese steel. It is clear from this figure that the transition temperature increased with increasing thickness. Moreover, the transition temperature was different for the two criteria. With increasing sample thickness, it would be expected that the transition temperature would rise to some limiting value as full plane strain conditions were met. This condition is inferred from FIG. 9.12 [FIG. 8M hereof], which shows the transition temperature reaching a maximum level with increasing thickness for three different steel alloys.

"It is clear, then, that the defined transition temperature will depend not only on the measurement criteria but also on the thickness of the test bar. Therefore, laboratory results may bear no direct relation to the transition temperature characteristics of the engineering component if the component's thickness is different from that of the test bar. To overcome this difficulty, the dynamic tear test (DT) and drop weight tear test (DWTT) were developed wherein the sample thickness was increased to the full thickness of the plate. \*\*\* both tests involve three-point bending of a notched bar. The basic difference between the two is the notch detail; the DWTT contains a shallow notch (5 mm deep) which is pressed into the edge of the sample with a sharp tool, while the DT notch is deeper and embedded within a titanium embrittled electron beam weld. These samples are broken in either pendulum or drop weight machines that are calibrated to measure the fracture energy of the sample. Hence, energy absorption versus test temperature plots can be obtained in the same manner as with Charpy specimens. As such, the DWTT and DT specimens may be considered to be oversized Charpy samples. The big difference lies in the fact that these samples are much thicker and wider than the Charpy specimen, resulting in much greater plactic constraint at the notch root. As a result, the transition temperature is shifted dramatically to higher temperatures (FIG. 9.14) [FIG. 8N hereof]. It is important to note from FIG. 9.14 that the DT, Robertson crack arrest test, and the drop weight NDT test results all indicate brittle material response at about −20° C. for this material while the Charpy test indicates very tough behavior. Such sharp contrasts in test results are most disturbing when engineering design decisions must be made.

"In addition to transition temperature-thickness effects, there are uncertainties relating to *crack length* effects as well. This may be seen by considering implications of a graphical representations of Eq. 8-22 (FIG. 9.15) [FIG. 8-O hereof]. We see the general relationship between flaw size and allowable stress level for a material with a given toughness level. The solid line represents the material toughness $K_c$ assuming ideally elastic conditions, and the dashed portion of the curve reflects the reality of crack tip plasticity. On the basis of the necessary energy to break a component, brittle conditions would be associated with the right side of the curve, while tough behavior would be found under conditions associated with the left side of the plot. Consequently, it is seen that a notched bar with crack length $a_1$ would be brittle at room temperature, but the same matrial with a crack length $a_3$ would exhibit tough behavior. If a sample with intermediate carck length, say $a_2$, were tested, the material also would be tough at room temperature. Since the brittle region of this curve is truncated by the onset of plastic deformation when the applied stress reaches the material yield strength, the brittle domain can be expanded simply by lowering the test temperature. Consequently, if the test temperature were to be reduced from $T_1$ to $T_2$, the sample response with crack length $a_2$ would change from tough to brittle, and the sample with crack length $a_3$ would still exhibit high toughness. An additional temperature reduction would be necessary for this sample to exhibit brittle behavior.

"From the above discussion, it becomes apparent that a wide range of "transition temperatures" can be obtained simply by changing the specimen thickness and/or crack length of the test bar. For this reason, transition temperature values obtained in the laboratory bear little relation to the performance of the full-scale component, thereby necessitating a range of correction factors as discussed earlier.

"As mentioned above, the onset of brittle fracture is not always accompanied by the occurrence of the cleavage microscopic fracture mechanism. Rather, it should be possible to choose a specimen size for a given material, and tailor both thickness and planar dimensions such that a temperature-induced transition in energy to fracture, amount of lateral contraction, and macroscopic fracture appearance would occur without the need for a microscopic mechanism transition. Figure \*\*\*, from the work of Begley, is offered as proof of this statement. Substandard thickness Charpy bars of 7075-T641 aluminum alloy were tested and shown to exhibit a temperature-induced transition in impact energy and fracture appearance. As noted in FIG. \*\*\*, no such transition was observed when standard Charpy specimens of an aluminum alloy were broken."

(18) See FIGS. 15-15, 16, 17 [FIGS. 8P, Q, R hereof], of Steel Castings Handbook, 5th Ed; page 15-7.

(19) See FIG. 9.11 [FIG. 8L hereof] at page 307 of Deformation and Fracture Mechanics of Engineering Materials by Richard W. Hertzberg.

(20) According to The Structure and Properties of Materials, Vol. III, Mechanical Behavior by Hayden, Moffatt & Wolff, published 1965 by John Wiley & Sons, at pages 159–161:

"7.7 DUCTILE TO BRITTLE TRANSITION

A transition from ductile to brittle fracture may be observed in BCC metals on decreasing the temperature, increasing the strain rate, or notching the material. The notched bar impact test described in Section 1.5 can be used to determine the temperature range over which the transition takes place. In this test, the determination of the transition temperature depends on (1) the transition in energy absorbed, (2) the transition in ductility, (3) the change in fracture appearance, and (4) the contraction at the root of the notch. The top curve of FIG. 7.12 [FIG. 8-S hereof] shows the transition based on energy absorption, the middle curve indicates a fracture transition, and the bottom curve a ductility transition. It is quite evident that the transition temperature is not a sharply defined temperature, and tests on the same lot of material exhibit appreciable scatter. In general, the sharper the notch, the higher the transition temperature. This is evident in FIG. 7.12 [FIG. 8S hereof] where curves for the V-notch Charpy specimens are compared with keyhole Charpy specimens. For steels and V-notched specimens the transition temperature is taken as that at which 10 or 15 ft-lb of energy are absorbed. The transition temperature is often taken to be that at which 50 percent fibrous (shear) fracture is obtained. When using a ductility criterion, the transition temperature is arbitrarily set for a 1 percent lateral contraction at the notch. In general, the fracture criterion for estimating transition temperature usually gives a higher transition temperature than that obtained using energy or ductility parameters. The scatter in transition temperature measurements is nevertheless great and depends to a large extent on testing conditions.

"The importance of a notch in the impact test specimens is of significance in interpreting the origin of brittle failure. The notch provides a stress concentration and a constraint to plastic deformation at its tip. When a load is applied, the notched region is in a state of triaxial tension. Slip or ductile deformation, which requires shear, will be suppressed by such a state of stress. Thus a notched specimen can support a much higher level of true tensile stress than an unnotched one. As a notched specimen is loaded high enough in simple tension, the material at the notch will try to yield. It would like to do so shrinking inward in the plane perpendicular to the applied tensile stress. The metal lying above and below the notch has not yielded and prevents yielding of the notch material. The latter is therefore subjected to three tensile stresses (triaxial). The first is the applied tensile stress, and the other two are induced horizontal tension stresses. If a mild steel tensile specimen were unnotched and subjected to the same applied true tensile stress as a notched one, it would yield at less than half the true tensile load sustained by the notched specimen. In the case of an ideally deep and sharp notch, the true tensile stress necessary to cause yielding in a notched specimen is three times as high as that for an unnotched specimen. The notch thus provides plastic constraint. The triaxial state of stress that it induces restrains plastic deformation and favors brittle fracture.

"In materials whose yield stress increases sharply with increasing strain rate or decreasing temperature, for example, low carbon steel, the presence of notches and microcracks can induce brittleness. At intermediate temperatures [see, p. 132 of reference], only after the crack tip reaches a rather high velocity does brittle failure occur. The high strain rate at the head of a rapidly propagating crack has then coupled with the plastic constraint in raising the yield stress above that necessary for cleavage (brittle fracture). Thus, if a very sharp notch is made in a steel plate and it is torn apart under tension, plastic deformation at the root of the notch will be found under all testing conditions. This plastic deformation takes the form of a small indentation and is of sufficient magntitude that in plates one-half inch thick that had atomically sharp notches, the resulting ripple can actually be felt on the surface of the sample."

and at page 164 a definition is given:

"Brittle Fracture. A mode of fracture characterized by the nucleation and rapid propagation of a crack with very little accompanying plastic deformation. Brittle fracture surfaces in crystalline materials can be identified by their shiny, granular appearance."

(21) The results of tests on certain wear sleeves at different temperatures and loading speeds were reported by applicant's assignee as follows:

"We ran four tests trying to establish how different parameters affect the cracking of crackable wear-knot [trademark] sleeves. On all four of the tests that we ran, the wear-knot sleeve had a scratch down both sides of the sleeve in the notch as well as beyond the notch to the ends of the sleeve.

Test No. 1 was run at room temperature using impact to try to split the sleeve. We were unable to crack the sleeve using this method. Measuring the sleeve ID before and after the test showed no yielding.

Test No. 2 was also an impact test. This sleeve was first chilled with a solution of dry ice and acetone. This brought the temperature of the sleeve down to approximately $-109°$ F. On impact this sleeve broke but only on one side. Repeating impacts over and over (approximately 6 times) the other side finally broke. This indicated that temperatures around $-100°$ F. were not cold enough to do a good job of splitting the sleeve.

Test No. 3 was not an impact test. This sleeve was put in the splitting fixture and pushed hydraulically making a slow split. In this test, the sleeve was chilled with liquid nitrogen bringing the temperature down to $-320°$ F. On running the test, the sleeve cracked adequately as in our previous nitrogen impact test.

The fourth test was run at room temperature and hydraulically. In this case, there was no brittle frature. The sleeve yielded and then broke on one side. With continued pushing, the sleeve just opened up without breaking the other side.

All these tests had scratches on the sleeves. The scratches seemed to have no effect on the crack growth pattern up and down the sleeve."

I claim:

1. Drill pipe comprising a tube, a tool joint at each end of the tube, a fractured sleeve welded together about the tube, said sleeve having an inner diameter smaller than the outer diameters of the tool joints, and adhesive cement between the sleeve and tube affixing the sleeve against axial and circumferential motion relative to the tube, said sleeve being fractured longitudinally at intervals not greater than one hundred and eighty degrees measured in both directions about the sleeve circumference.

2. Drill pipe according to claim 1, said sleeve being fractured along a plurality of longitudinal lines extending to the inner periphery of the sleeve, and welded along a plurality of grooves extending from end to end of the sleeve adjacent and externally of said lines of fractures.

3. Drill pipe according to claim 1, said grooves and lines being 180 degrees apart.

4. Drill pipe according to any of claims 2 or 3 wherein said sleeve is conically tapered at each end and the grooves are deeper between the tapered portions at each end where they are shallower, said grooves extending at least half way through the thickness of the sleeve wall.

5. Method of manufacturing belted drill pipe which drill pipe includes a tube and a wear belt about the tube in between the ends of the tube, said method comprising the steps of:

providing a tube and a wear belt, said belt including a circumferentially homogeneously integral metal sleeve, forming a plurality of grooves in the sleeve extending from adjacent one end to adjacent the other end thereof, and not in excess of 180 degrees apart circumferentially, cooling the entire sleeve to at least the ductile—brittle transition temperature, extending the sleeve radially while at a temperature at least as low as said transition temperature to cause the sleeve to fracture along said grooves into a plurality of segments, setting said segments with the fracture surfaces aligned and in engagement to reform the sleeve about said tube in the desired axial position therealong, welding said segments together along said grooves, and affixing said sleeve to said tube against both rotational and axial movement relative to said tube.

6. Method of manufacturing belted drill pipe which includes a tube with a tool joint at each end and a wear belt about the tube in between the tool joints and spaced axially therefrom comprising the steps of:

providing a tube with a tool joint at each end, providing a wear belt including a circumferentially homogeneously integral metal sleeve, forming a plurality of grooves in the sleeve extending from adjacent one end to adjacent the other end thereof, and not in excess of 180 degrees apart circumferentially, cooling the entire sleeve to at least the ductile-brittle transition temperature, expanding the sleeve radially while at a temperature at least as low as said transition temperature to cause the sleeve to fracture along said grooves into a plurality of segments, setting said segments with the fracture surfaces aligned and in engagement to reform the sleeve about said tube in the desired axial position therealong, welding said segments together along said grooves, and affixing said sleeve to said tube against both rotational and axial movement relative to said tube.

7. Method of claim 6, the expanding of the sleeve being effected by impact loading.

8. Method of claim 7 wherein said sleeve is made of steel and said cooling is to a temperature at least as low as minus two hundred degrees Fahrenheit.

9. Method of claim 8 wherein said cooling is effected by immersing the sleeve in liquid nitrogen and leaving it there until the nitrogen stops boiling, and the sleeve segments are returned to room temperature before they are welded together.

10. Method of claim 6 including, forming a scratch in the bottom of each groove before the sleeve is fractured.

11. Method of any of claims 6, 7, 8, 9 or 10 wherein said expanding is effected by placing the sleeve on a split tubular internally tapered mandrel and driving a wedge into the mandrel.

12. Method of any of claims 6, 7, 8, 9 or 10 wherein said welding is effected by holding the segments together initially with a clamp, isolating the sleeve from the tube with a strip of metal non-adhesive to the weld metal placed between the sleeve and tube along the inner edge of one of the grooves, and filling the groove with weld metal, and repeating the isolating and filling steps at each groove.

13. Method of any of claims 6, 7, 8, 9 or 10 wherein said affixing is effected by flowing adhesive plastics material between the sleeve and tube and curing the plastics material.

14. Method of any of claims 6, 7, 8, 9 or 10, the original prefracturing sleeve having an external annular groove therearound, reforming said annular groove where blocked by said welding, and filling said groove with hard facing.

15. Method of attaching a wear sleeve to a drill pipe tube having at each end a tool joint larger in diameter than the internal diameter of the sleeve, comprising externally notching the sleeve longitudinally at circumferential intervals of no greater than 180 degrees and to a depth over 50% of the sleeve wall thickness, cooling the entire sleeve to at least the ductile-brittle transition temperature, and with the entire sleeve still at or below said temperature creating hoop tension in the sleeve and thereby fracturing the sleeve along the longitudinal notches into a plurality of portions, assembling the sleeve portions about the tube with the fracture surfaces mating and engaged, welding the portions of the sleeve together, and cementing the sleeve portions to the tube.

* * * * *

UNITED STATES PATENT AND TRADEMARK OFFICE
CERTIFICATE OF CORRECTION

PATENT NO. : 4,499,924

DATED : FEBRUARY 19, 1985

INVENTOR(S) : WILLIAM R. GARRETT

It is certified that error appears in the above—identified patent and that said Letters Patent is hereby corrected as shown below:

Column 10, line 64; change "applied tensile" to -- *applied tensile* --.

Column 10, line 67; change "true" to -- *true* --.

Column 10, line 68; change "true" to -- *true* --.

Column 11, line 2; change "sharp notch" to -- *sharp notch* --.

Column 12, line 48; change "brittle" to -- *brittle* --.

Column 14, line 50; change "1o-strength" to --low-strength--.

Column 14, line 59; change "warner" to -- warmer --.

Column 15, line 1; change -- LIMITATIONS -- to -- "LIMITATIONS" --.

UNITED STATES PATENT AND TRADEMARK OFFICE
CERTIFICATE OF CORRECTION

PATENT NO. : 4,499,924

DATED : FEBRUARY 19, 1985

INVENTOR(S) : WILLIAM R. GARRETT

It is certified that error appears in the above—identified patent and that said Letters Patent is hereby corrected as shown below:

Column 17, lines 55 and 56; change "intermediate temperatures" to -- *intermediate temperatures* --.

Column 19, line 22; change "rotatinal" to -- rotational --.

Signed and Sealed this

Third Day of September 1985

[SEAL]

Attest:

DONALD J. QUIGG

Attesting Officer     Acting Commissioner of Patents and Trademarks - Designate